(12) United States Patent
Gabor et al.

(10) Patent No.: US 10,346,171 B2
(45) Date of Patent: Jul. 9, 2019

(54) END-TO END TRANSMISSION OF REDUNDANT BITS FOR PHYSICAL STORAGE LOCATION IDENTIFIERS BETWEEN FIRST AND SECOND REGISTER RENAME STORAGE STRUCTURES

(71) Applicant: Intel Corporation, Santa Clara, CA (US)

(72) Inventors: Ron Gabor, Hertzliya (IL); Yiannakis Sazeides, Nicosia (CY); Arkady Bramnik, Kiryat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 15/402,825

(22) Filed: Jan. 10, 2017

(65) Prior Publication Data
US 2018/0196674 A1    Jul. 12, 2018

(51) Int. Cl.
*G06F 9/38* (2018.01)
*G06F 9/30* (2018.01)
*G06F 11/08* (2006.01)

(52) U.S. Cl.
CPC .......... *G06F 9/384* (2013.01); *G06F 9/30101* (2013.01); *G06F 9/30105* (2013.01); *G06F 9/3861* (2013.01); *G06F 11/08* (2013.01)

(58) Field of Classification Search
None
See application file for complete search history.

(56) References Cited

U.S. PATENT DOCUMENTS

| 5,805,916 | A  | * | 9/1998  | Mallick  | G06F 9/30014 712/217 |
| 5,974,524 | A  | * | 10/1999 | Cheong   | G06F 9/384 712/218   |
| 6,256,721 | B1 | * | 7/2001  | Witt     | G06F 9/30032 712/218 |
| 6,279,102 | B1 | * | 8/2001  | Morrison | G06F 9/30098 712/208 |
| 6,308,260 | B1 | * | 10/2001 | Le       | G06F 9/3836 712/215  |

(Continued)

OTHER PUBLICATIONS

Extended European Search Report for Application No. 18150318.6, dated Jun. 6, 2018, 7 pages.

(Continued)

*Primary Examiner* — Eric Coleman
(74) *Attorney, Agent, or Firm* — NDWE, LLP

(57) ABSTRACT

A processor of an aspect includes a plurality of physical storage locations, and a register rename unit. The register rename unit includes a first register rename storage structure that is to store a given physical storage location identifier, which is to identify a physical storage location of the plurality of physical storage locations, and that is to store a corresponding given one or more redundant bits. The register rename unit also includes a second register rename storage structure. The register rename unit also includes a first conductive path coupling the first and second register rename storage structures. The first conductive path is to convey the given one or more redundant bits end-to-end from the first register rename storage structure to the second register rename storage structure. Other processors are also disclosed, as well as methods and systems.

23 Claims, 14 Drawing Sheets

(56) References Cited

U.S. PATENT DOCUMENTS

| | | | |
|---|---|---|---|
| 2006/0090061 A1* | 4/2006 | Akkary | G06F 9/3836 |
| | | | 712/214 |
| 2007/0050602 A1* | 3/2007 | Lien | G06F 9/3836 |
| | | | 712/217 |
| 2013/0151819 A1 | 6/2013 | Piry et al. | |
| 2016/0103736 A1* | 4/2016 | Bose | G06F 11/073 |
| | | | 714/764 |

OTHER PUBLICATIONS

Kumar S., et al., "Reducing Resource Redundancy for Concurrent Error Detection Techniques in High Performance Microprocessors," International Symposium on High-Performance Computer Architecture, Proceedings, Jan. 1, 2006, pp. 215-224.

Notice of Allowance from U.S. Appl. No. 15/402,835, dated Jul. 17, 2018, 3 pages.

Vera X., et al., "Selective Replication," ACM Transactions on Computer Systems (TOCS), Association for Computer Machinery, Inc, US, vol. 27 (4), Jan. 1, 2010, pp. 1-30.

* cited by examiner

END-TO END TRANSMISSION OF REDUNDANT BITS FOR PHYSICAL STORAGE LOCATION IDENTIFIERS BETWEEN FIRST AND SECOND REGISTER RENAME STORAGE STRUCTURES

BACKGROUND

Technical Field

Embodiments described herein relate to processors. More specifically embodiments described herein generally relate to register renaming in processors.

Background Information

Processors are generally designed to have and/or support an instruction set architecture (ISA). The ISA represents the part of the architecture of the processor related to programming. The ISA may define or specify the native instructions, architectural registers, data types, and certain other architectural aspects of the processor.

The architectural registers may represent those registers that are exposed or visible to software and/or a programmer. For example, the architectural registers may represent those registers that instructions of an instruction set of the processor indicate to identify their source and/or destination operands.

Commonly, there may be a relatively small number of architectural registers of a given type and/or at least less registers of the given type than may be desirable. One possible reason for this is to help promote a compact instruction encoding. If more architectural registers were supported, then each of the architectural register indices or identifiers (often included in the instruction encoding) may need to have more bits, which may tend to increase the instruction length.

BRIEF DESCRIPTION OF THE DRAWINGS

The invention may best be understood by referring to the following description and accompanying drawings that are used to illustrate embodiments. In the drawings.

DETAILED DESCRIPTION OF EMBODIMENTS

In the following description, numerous specific details are set forth (e.g., specific implementations of register renaming, specific register rename storage structures, specific microarchitectural details, specific sequences of operations, etc.). However, embodiments may be practiced without these specific details. In other instances, well-known circuits, structures, and techniques have not been shown in detail to avoid obscuring the understanding of the description.

Figure 1:
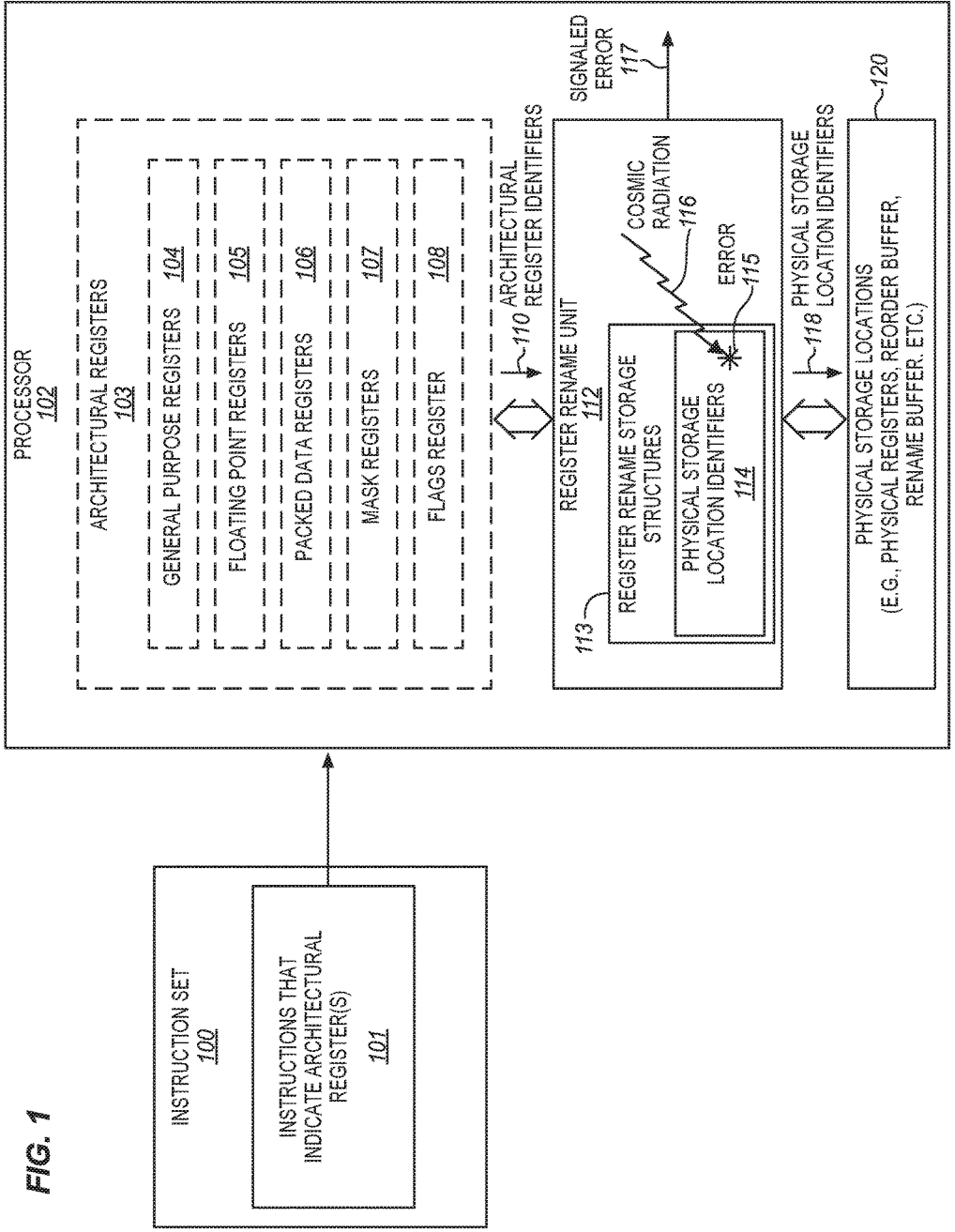
FIG. 1 is a block diagram of an embodiment of a processor that includes a register rename unit that is suitable for implementing embodiments.

FIG. 1 is a block diagram of an embodiment of a processor 102 that includes a register rename unit 112 that is suitable for implementing embodiments. In some embodiments, the processor may be a general-purpose processor (e.g., a central processing unit (CPU) or other general-purpose microprocessor of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

The processor may have and/or support an instruction set 100. The instruction set may include the set of instructions that the processor is natively able to perform (e.g., decode and execute). The instructions of the instruction set may represent macroinstructions, assembly language instructions, machine language instructions, or other relatively higher level instructions that are provided to the processor for execution, as opposed to microinstructions, micro-ops, or other decoded instructions or control signals that are decoded from the instructions of the instruction set.

The ISA may also define or specify one or more sets of architectural registers 103. As shown, at least some instructions 101 of the instruction set (e.g., various types of data processing instructions) may each explicitly specify or otherwise indicate one or more source and/or destination architectural registers of the one or more sets of architectural registers 103.

In some cases, an instruction may explicitly specify an architectural register. For example, the instruction may have a field or set of bits in its instruction encoding to provide an architectural register index or other architectural register identifier (e.g., a string of bits sufficient to uniquely identify one of the architectural registers). In other cases, an instruction may inherently, impliedly, or otherwise implicitly indicate a given/fixed architectural register. For example, it may be implicit (e.g., to the instructions opcode) to use the given/fixed architectural register, even though the instruction may not have any non-opcode bits to explicitly specify the given/fixed architectural registers index or identifier. As one specific illustrative example, a scalar multiply instruction may have a first field to explicitly specify a first architectural register identifier to identify a first source architectural register that is to be used to store a multiplicand, may have a second field to explicitly specify a second architectural register identifier to identify a second source architectural register that is to be used to store a multiplier, and may implicitly indicate that the first source architectural register is also to be reused as a destination architectural register where a product is to be stored.

Various types of architectural registers may optionally be defined or specified in various embodiments. Examples of suitable types of architectural registers include, but are not limited to, general purpose registers 104, floating point registers 105, packed data registers 106, mask registers 107, a flag register 108, and various combinations thereof. The packed data registers may also sometimes be referred to as vector registers or single instruction, multiple data (SIMD) registers. The mask registers may also sometimes be referred to as predicate registers. The flags register may also be referred to as status register or condition code register. In various embodiments, any one or more, or any combination, of these architectural registers, as well as other types of architectural registers, may optionally be renamed through register renaming using the approaches disclosed herein.

One reason for register renaming is that commonly there may tend to be a relatively small number of architectural registers of each different type and/or less than desired. This may tend to cause more frequent register reuse (e.g., since there is only a relatively small number of architectural registers in which to store the operands of the instructions being performed). By way of example, consider the following pseudocode:

Line 1: R1←M[2056] (load value at memory 2056 into register R1)
Line 2: R1←R1+6 (add 6 to value in R1 and store result in R1)
Line 3: M[2048]←R1 (store value in register R1 to memory 2048)
Line 4: R1←M[1032] (load second value at memory 1032 into R1)
Line 5: R1←R1−3 (subtract 3 from value in R1 and store result in R1)
Line 6: M[1024]←R1 (store value in R1 to memory 1024)

Notice that the same architectural register R1 is reused by both the instructions/operations of lines 1-3 as well as the instructions/operations of lines 4-6. The instructions/operations of lines 4-6 do not have any true data dependencies on those of lines 1-3. However, the instruction/operation of line 4 cannot be performed until that of line 3 has finished. Otherwise, an error could result (e.g., the value from M[1032] loaded into R1 in line 4 could be stored to M[2048] at line 3 instead of the value of R1 calculated in line 2). This is an example of a write-after-read (WAR) data hazard in which a read from a register (e.g., at line 3) should generally return the latest value written to that register (e.g., at line 2) instead of a value written to that register (e.g., at line 4) after the read (e.g., at line 3) in original program order. Specifically, the reuse of the register R1 by both the instructions/operations of lines 1-3 and lines 4-6 has created what is referred to as a "false" data dependency. The data dependency is said to be "false" because the data dependency does not originate from the instructions/operations themselves (e.g., the earlier instructions/operations of lines 1-3 in program order do not produce data that is to be used by those of lines 4-6 subsequent in the program order). Rather, the data dependency is due to the reuse of the architectural register R1. Such false data dependencies are also sometimes referred to as "name" dependencies. Another type of false dependency is a write after write (WAW) or anti-dependency. An example would be the instruction of line 5 executing before the instruction of line 2, and then subsequently the instruction of line 2 overwriting the result stored by the instruction of line 5. This can lead to the instruction of line 6 using the wrong source data.

Referring again to FIG. 1, the processor includes a register rename unit 112 and a set of physical storage locations 120. The register rename unit may be operative to perform register renaming to rename individual ones of the architectural registers 103 to individual ones of the physical storage locations 120. For example, the register rename unit may receive at least some of the architectural register identifiers 110 that are indicated by the instructions 101 being performed, and may be operative to map, replace, or otherwise rename these architectural register identifiers to corresponding physical storage location identifiers 118 that each identify ones of the physical storage locations 120. In some embodiments, the register rename unit may include two or more register rename storage structures 113 (e.g., array storage structures, table storage structures, first in, first out (FIFO) storage structures, circular buffer storage structures, a free list storage structure, a register map storage structure, a reclamation table storage structure, a register history table storage structure, a reorder buffer, a checkpoint table storage structure, etc.) to store physical storage location identifiers 114. In various embodiments, any one or more, or any combination, of the previously described types of architectural registers 104, 105, 106, 107, 108, as well as other types, may optionally be renamed by the register rename unit.

The register renaming may help to eliminate at least some of the "false" or "name" data dependencies. To further illustrate, consider an application of register renaming to the pseudocode described above. With register renaming, the architectural register R1 used in lines 1-3 may be renamed to a first physical storage location P1, and the architectural register R1 used in lines 4-6 may be renamed to a second different physical storage location P2 as follows:

Line 1: P1←M[2056]
Line 2: P1←P1+6
Line 3: M[2048]←P1
Line 4: P2←M[1032] (P2 used instead of P1)
Line 5: P2←P2−3
Line 6: M[1024]←P2

In practice, such register renaming may include replacing the architectural register index or identifier for R1 (e.g., one string of bits) with physical storage location identifiers for P1 and P2 (e.g., two different strings of bits). Since typically more physical storage locations are employed than the number of architectural registers (e.g., to reduce physical storage location reuse), each of the physical storage location identifiers generally has more bits than the architectural register identifier. By way of example, the architectural register identifiers may commonly have from 3-bits to 6-bits, whereas the physical storage location identifiers may commonly have from 6-bits to 10-bits, although the scope of the invention isn't limited to any such numbers of bits.

Such register renaming may be useful to help reduce false data dependencies created by write-after-read (WAR) data hazard scenarios (e.g., in which a read from a register should generally return the latest prior value written to that register instead of a value written to that register after the read in original program order). Such register renaming may also be useful to reduce anti-dependencies due to write-after-write (WAW) data hazard scenarios (e.g., when a later instruction writes to a register before an earlier instruction). This may help to allow more instruction-level parallelism, which may be exploited by various and complementary techniques such as, for example, superscalar execution, out-of-order execution, and the like, to help improve performance. For example, notice that the register renaming has eliminated the false data dependencies between lines 1-3 and 4-6. The instructions/operations of lines 4-6 may now be performed concurrently with and/or out-of-order with respect to the instructions/operations of lines 1-3, without causing erroneous results. Instead of having to delay the write at line 4 until the prior read at line 3 has been completed, two different physical storage locations (P1 and P2) have been used, with one (P1) storing the original value before the write and another (P2) storing the new value after the write. Then, the physical storage locations mapped to the logical registers may be reclaimed for further register renaming when the next instruction in original program order that writes to the same logical register commits.

The physical storage locations 120 may be of various types in different embodiments. In some embodiments, the physical storage locations 120 may optionally include a merged rename and architectural register file. The merged rename and architectural register file may include a single set of physical registers, generally larger in number than the number of architectural registers being renamed, and the role of the physical registers may be changed from renamed registers to architectural registers as instructions are retired or otherwise committed. In other embodiments, the physical storage locations 120 may optionally include both entries in a reorder buffer (ROB) as well as a set of architectural (also referred to as retirement) registers. Entries in the ROB may be used to store operands until instructions are committed, and then the operands may be transferred to and stored in the architectural registers. These are just a few illustrative examples. Other types of physical storage locations, and combinations of different types, may optionally be used (e.g., one of the above described approaches may be used for one set of architectural registers whereas a different approach may be used for another set of architectural registers). In the illustration, the architectural registers 103 are shown in dashed lines to indicate that, in some register rename approaches they may actually exist as a set of actual physical registers, whereas in other register rename approaches they may not actually exist as a set of actual physical registers, but rather may represent logical registers that are aliased or mapped at appropriate times to physical storage locations.

One significant challenge is that the register rename unit 112 may tend to be susceptible to certain types of errors, such as, for example, soft errors, hard errors, logic errors, and combinations thereof. The soft errors may include transient bit flips that may be caused by cosmic radiation, manufacturing defects, latent faults, timing imperfections, device aging, and the like, and combinations thereof. The hard errors may include stuck bits that are stuck at a particular binary value (e.g., bits stuck at binary 0 or binary 1). Such hard errors may be caused in part by manufacturing defects, latent faults, aging, and combinations thereof. Logic errors may represent late post-silicon bugs or errors that may potentially be caused by soft or hard errors. In some cases, such errors may flip one or more bits or change a value of a physical storage location identifier used for register renaming. By way of example, cosmic radiation 116 may impact one of the physical storage location identifiers 114, for example when it is stored in the register rename storage structures or being transmitted between the storage structures, and may cause one or more transient bit flips that represent an error 115. In other cases, the physical storage location identifiers may be changed by other soft errors, hard errors, logical errors, or various combinations thereof (e.g., there could be soft, hard, or logic errors in logic or structures used to convey or process the physical storage location identifiers). In some embodiments, the register rename unit 112 may include and/or use the embodiments disclosed elsewhere herein (e.g., in conjunction with FIGS. 3-6) to help support error detection.

Figure 2:
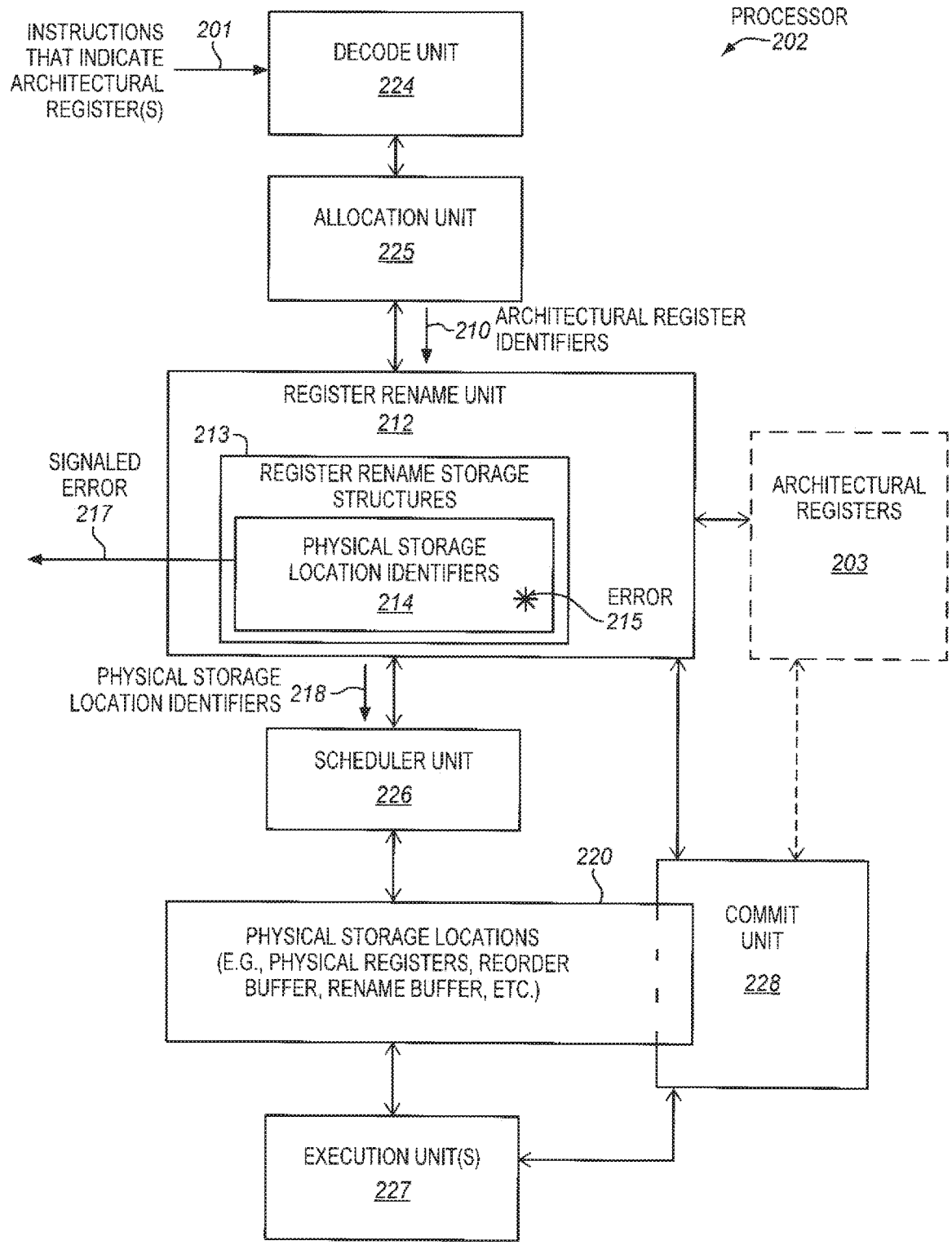
FIG. 2 is a block diagram of a detailed example embodiment of an out-of-order execution processor that includes a register rename unit that is suitable for implementing embodiments.

FIG. 2 is a block diagram of a detailed example embodiment of an out-of-order execution processor 202 that includes a register rename unit 212 that is suitable for implementing embodiments. The processor 202 includes a register rename unit 212, one or more sets of architectural registers 202, and physical storage locations 220, which may optionally be similar to, or the same as, the correspondingly named components of FIG. 1. To avoid obscuring the description, the new and different characteristics of FIG. 2 will primarily be described.

During operation, the processor may receive at least some instructions 201 of an instruction set that may each explicitly specify or otherwise indicate one or more architectural registers in one or more sets of architectural registers 203. The processor includes a decode unit or decoder 224 to decode the instructions 201. The decode unit may output one or more relatively lower-level instructions or control signals (e.g., one or more microinstructions, micro-operations, micro-code entry points, or other decoded instructions or control signals) that are derived from each of the instructions.

An allocation unit 225 is coupled with the decode unit. The allocation unit may reserve or allocate resources to be used by the decoded instructions or control signals output from the decoder. Possible examples of such resources include, but are not limited to, entries in a scheduler unit 226 (e.g., entries in one or more reservation stations), reorder buffer (ROB) entries, load/store queue entries, branch buffer entries, and the like.

The register rename unit 212 is coupled with the allocation unit 225. The register rename unit may receive at least some input architectural register identifiers 210 indicated by the instructions 201 and may be operative to rename at least some of these input architectural register identifiers to corresponding output physical storage location identifiers 218 that identify corresponding ones of the physical storage locations 220. For example, the source architectural registers of a given instruction may be renamed to physical storage locations that were previously allocated to the same architectural register (e.g., which was the destination architectural register of a prior instruction), and the destination architectural register of the given instruction may be allocated to one of the free/available physical storage locations. Any of the previously described types of architectural registers may optionally be renamed. In some embodiments, the register rename unit may include two or more register rename storage structures 213 to store physical storage location identifiers 214. One significant challenge is that an error 215 (e.g., a soft error, hard error, logic error, or a combination thereof) may potentially occur in the physical storage location identifiers while they are stored in the register rename storage structures and/or when they are transmitted between such storage structures. In some embodiments, the register rename unit 212 may include and/or use the embodiments disclosed elsewhere herein (e.g., in conjunction with FIGS. 3-6).

Referring again to FIG. 2, a scheduler unit 226 is coupled with the register rename unit 212. The scheduler unit may include one or more reservations stations, one or more instruction queues, one or more instruction buffers, one or more instruction windows, or the like. In some cases, the scheduler unit may represent a centralized unit, whereas in other cases the scheduler unit may include distributed scheduler sub-units (e.g., each co-located with a corresponding one of the execution unit 227). The instructions or control signals output from the decode unit may be dispatched to the scheduler unit. The scheduler unit may also receive the output physical storage location identifiers 218. The scheduler unit may store the instructions or control signals output from the decode unit that are waiting to execute due to unavailability of operands and/or resources. By way of example, if the operands are not available, the scheduler unit may monitor communications on a bus or other interconnect for the operands to become available (e.g., broadcasts of destination physical storage location identifiers when an execution unit stores results to them). When all needed operands and/or resources for an instruction or control signal are available, the instruction or control signal may be issued to one or more execution units 227. Instead of the instructions or control signals being scheduled/issued and executed in the original program order, they may be scheduled/issued and executed out-of-order based on the availability of needed data and/or resources.

The set of physical storage locations 220 are coupled with the scheduler unit 226. The various types of physical storage locations previously mentioned for FIG. 1 are suitable. In the illustration, the architectural registers 203 are shown in dashed lines to indicate that they may or may not actually exist as a set of actual physical registers.

The one or more execution units 227 are coupled with the set of physical storage locations 220. The execution unit(s) may receive the operands needed to perform the instructions (e.g., from the physical storage locations). The execution units may perform the operations specified by the instructions, and in the case of data producing instructions may generate result operands. The result operands may be stored to the destinations (e.g., to destination physical storage locations 220). In some cases, the destination physical storage location identifiers may be broadcast on a bus or other interconnect. The scheduler unit 226 may monitor for such broadcasts or communications, and may match the broadcast destination physical storage location identifiers against those needed as source operands by its queued instructions or control signals.

A retirement unit, or other commit unit 228, is coupled with the execution units 227, the set of physical storage locations 220, and the register rename unit 212. The commit unit may be operative to commit instructions in original program order. For example, the commit unit may wait to commit each instruction until all older/prior instructions ahead of it in the original program order have already been committed. Committing the instructions may include committing the results of the instructions (e.g., which may be stored in the physical storage locations 220) to architectural state. This may be done in different ways depending upon how the physical storage locations are implemented. As another example, this may include transferring data from either a reorder buffer, or a rename buffer, to a set of architectural registers.

To avoid obscuring the description, a relatively simple processor 202 has been shown and described. However, the processor may optionally include other processor components. For example, various embodiments may include different combinations and configurations of the components shown and described for any of FIGS. 7B, 8A, 8B. The components of the processor may be coupled together in known ways to allow them to operate.

Figure 3:
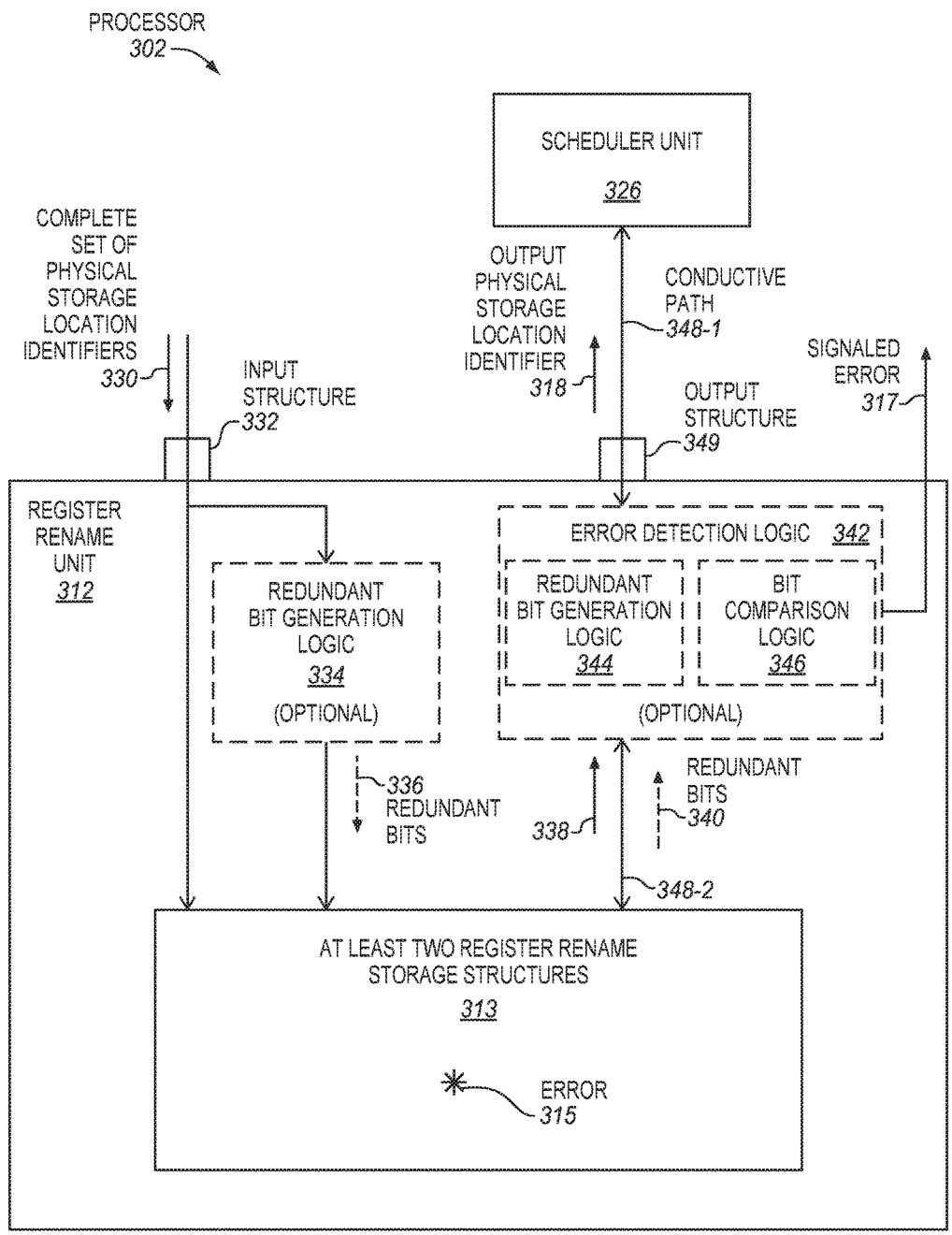
FIG. 3 is a block diagram of a processor having an embodiment of a register rename unit that has redundant bit generation logic and error detection logic.

FIG. 3 is a block diagram of a processor 302 having an embodiment of a register rename unit 312 that has redundant bit generation logic 334 and error detection logic 342. In some embodiments, the register rename unit 312 may optionally be included in the processor 102 of FIG. 1 and/or the processor 202 of FIG. 2. Alternatively, the register rename unit 312 may optionally be included in a similar or different processor or other apparatus. Moreover, the processor 102 and/or the processor 202 may each include either a similar or different register rename unit than that of FIG. 3.

Prior to register renaming being performed, at register rename initialization (e.g., which may be performed at boot, reset, system initialization, restart, or the like), a complete set of physical storage location identifiers 330 may be transmitted or otherwise provided to the register rename unit 312. The complete set of physical storage location identifiers may represent all physical storage location identifiers that are used to identify the complete set of physical storage locations that are used for register renaming. The register rename unit 312 has an input structure 332 to receive the complete set of physical storage location identifiers. Examples of suitable input structures include, but are not limited to, a port, a connection with a bus or other interconnect, an interface, or the like.

In some embodiments, the register rename unit may optionally include an embodiment of redundant bit generation logic 334. The redundant bit generation logic may be operative to calculate, derive, or otherwise generate a corresponding set of one or more redundant bits 336 for each of the complete set of physical storage location identifiers 330. In some embodiments, the redundant bit generation may be done on the fly when the complete set of physical storage location identifiers is initially stored into the register rename unit (e.g., at boot, reset, initialization, restart, or the like), although this is not required. In some embodiments, the redundant bit generation logic may include at least some hardware (e.g., transistors, capacitors, diodes, circuitry, non-volatile memory storing microcode, or the like). For simplicity of the description, the term "set of one or more redundant bits" may also be referred to herein simply as a "set of redundant bits," or "redundant bits," although it is to be appreciated that (unless specified otherwise) there may only be one or more redundant bits (e.g., optionally a single redundant bit, or optionally two or more redundant bits) for each corresponding physical storage location identifier.

The sets of redundant bits 336 represent extra bits in addition to the bits of the actual physical storage location identifiers 330. The sets of the redundant bits may be redundant relative to and/or derivable from their corresponding physical storage location identifiers. In some embodiments, the sets of redundant bits may represent error detection bits that may be used to detect errors, possibly within certain constraints as explained below, in their corresponding physical storage location identifiers. For example, in some embodiments, the error detection bits may represent parity bits or check bits. Suitable parity bits include even parity bits and odd parity bits. In the case of an even parity bit, the number of set bits (i.e., set to binary 1) in a given group of bits (e.g., the corresponding physical storage location identifier) from which the even parity bit is generated may be counted. If the total number of set bits is odd, then the even parity bit may be set (i.e., set to binary 1). Otherwise, if the total number of set bits is even, then the even parity bit may be cleared (i.e., cleared to binary 0). Conversely, in the case of an odd parity bit, the number of set bits (i.e., set to binary 1) in a given group of bits (e.g., the corresponding physical storage location identifier) from which the odd parity bit is generated may be counted. If the total number of set bits is even, then the odd parity bit may be set. Otherwise, if the total number of set bits is odd, then the odd parity bit may be cleared.

In an actual implementation, rather than counting the number of set bits, a logical operation (e.g., an XOR operation) may often be performed. For example, an XOR sum may be performed on the corresponding group of bits, to generate a parity bit. Accordingly, one specific example of suitable redundant bit generation logic 334 has an input structure to receive a physical storage location identifier, XOR logic (e.g., a set of XOR gates) to generate one or more parity bits from the received physical storage location identifier, and an output structure to provide or output the set of one or more generated parity bits, although the scope of the invention is not so limited. Possible advantages to the use of such parity bits is that they generally tend to be inexpensive to generate in terms of the amount of processing logic and time needed. However, if desired, in some embodiments, relatively more sophisticated types of error detection bits, or optionally error correction bits, may optionally be used. For example, in various embodiments, cyclic redundancy check (CRC) bits or values (e.g., check values), checksums, hashes, or error correction codes or bits (e.g., a Hamming code) may optionally be used.

In the illustration, the redundant bit generation logic 334 is shown in dashed lines to indicate that it is optional not required. In other embodiments, the redundant bit generation logic need not necessarily be a part of the register rename unit 312. As one example, the redundant bits may optionally be generated in software and then transmitted to the register rename unit. As another example, the redundant bits may optionally be generated by other logic of the processor (e.g., cryptographic logic) and then transmitted to the register rename unit. As yet another example, the redundant bits may optionally be pre-generated (e.g., in software or otherwise) and stored in an on-die non-volatile memory of the processor (e.g., a boot read-only memory (ROM) and then transmitted to the register rename unit at an appropriate time. Whether to generate the redundant bits on-die or in software may often depend in part upon the type of redundant bits, how much logic and time is needed to generate them, etc. As one example, in the case of parity bits it may be appropriate to include a relatively small amount of parity bit generation logic (e.g., XOR logic) within the register rename unit, but in the case of error correction codes other types of redundant bits it may be appropriate to perform the generation in software and then either transmit the redundant bits to the processor or store them in an on-die non-volatile memory of the processor.

Referring again to FIG. 3, the register rename unit also includes at least two register rename storage structures 315. The at least two register rename storage structures may receive the complete set of physical storage location identifiers 330 and the corresponding sets of redundant bits 336. The at least two register rename storage structures may be operative to store (e.g., have fields, entries, or other portions to store) the physical storage location identifiers and the sets of redundant bits. In some embodiments, as will be explained further below, the sets of redundant bits may be transmitted end-to-end between pairs of the at least two register rename storage structures along with their corresponding physical storage location identifiers during the various flows and/or processes involved in transferring the physical storage location identifiers between the register rename storage structures as part of register renaming. In some embodiments, at least one pair of the at least two register rename storage structures may optionally utilize the approach shown and described for FIG. 4, although this is not required. As shown, in some instances an error 315 in a physical storage location identifier may occur while it is stored in one of the at least two register rename storage structures and/or while it is being transmitted between a pair of the at least two register rename storage structures.

Referring again to FIG. 3, a scheduler unit 326 is coupled with the register rename unit 312. The scheduler and register rename units may be coupled by a conductive path 348-1, 348-2. The conductive path may broadly represent various types of conductive materials, interconnects, logic, and the like, that are used to convey or provide output physical storage location identifiers 318 from the register rename unit to the scheduler unit. The register rename unit may include an output structure 349 to output or provide these physical storage location identifiers. Examples of suitable output structures include, but are not limited to, a port, a connection with a bus or other interconnect, an interface, or the like.

In some embodiments, the register rename unit 312 may optionally include an embodiment of error detection logic 342 that is operative to detect errors in the physical storage location identifiers. In some embodiments, the error detection logic may include at least some hardware (e.g., transistors, capacitors, diodes, circuitry, non-volatile memory storing microcode, or the like). In some embodiments, the error detection may optionally be directly connected or coupled on the conductive path 348-1, 348-2 from the register rename unit to the scheduler unit. Errors in the output physical storage location identifiers 318 may lead to dataflow violations, system crashes, compromised functional correctness, and the like, when used by the scheduler unit to replace the source and/or destination architectural registers of instructions. Accordingly, performing the error correction on the conductive path 348-1, 348-2 leading from the register rename unit to the scheduler unit, or at least before the output physical storage location identifiers 318 are used by the scheduler unit, may tend to be beneficial. In the illustration, the error detection logic 342 is shown in dashed lines to indicate that it is optional not required. In other embodiments, the error detection logic may optionally be included outside of the register rename unit 312. For example, the error detection logic may alternatively and/or additionally be part of the scheduler unit 326, or may be disposed between the register rename unit 312 and the scheduler unit as a discrete unit.

In some embodiments, to detect errors (e.g., the error 315) in the output physical storage location identifiers 318, the error detection logic 342 and/or the register rename unit 312 may be operative to determine whether physical storage location identifiers 338 are consistent with the corresponding sets of redundant bits 340. As shown, the corresponding sets of redundant bits 340 may also be output, along with their corresponding physical storage location identifiers 338, on the conductive path 348-1 leading toward the scheduler unit. The error detection logic may receive the physical storage location identifiers 338 and their corresponding sets of one or more redundant bits 340. Initially, before any errors, each of the sets of redundant bits may have been previously deterministically generated from, and may be consistent with, the corresponding physical storage location identifier.

The error detection logic 342 and/or the register rename unit 312 may be operative to regenerate sets of redundant bits from the physical storage location identifiers 338 (e.g., using the same deterministic approach that had previously been used to generate the sets of redundant bits 336). In some embodiments, the error detection logic may optionally include redundant bit generation logic 344 for this purpose. The error detection logic and/or the register rename unit may also be operative to determine whether the newly regenerated sets of redundant bits equal or match the corresponding previously generated sets of redundant bits. In some embodiments, the error detection logic may optionally include bit comparison logic 346 that is operative to compare one or more newly regenerated redundant bits and the one or more corresponding previously generated redundant bits to make this determination. Various types of bit comparison logic are suitable including various logical operations (e.g., XOR, AND, OR, etc.).

If there is no error in the physical storage location identifiers 338 (e.g., none of the bits of the physical storage location identifiers 338 have changed), then the newly regenerated redundant bits and the one or more corresponding previously generated redundant bits should match. In such cases the error detection logic and/or register rename unit will not detect an error. Rather, the physical storage location identifiers 338 may be provided as the output physical storage location identifiers 318 to the scheduler unit. Alternatively, if there is an error in the physical storage location identifiers 338 (e.g., one or more of the bits of the physical storage location identifiers 338 have changed), then the newly regenerated redundant bits and the one or more corresponding previously generated redundant bits (at least under certain conditions depending upon the particular type of redundant bits) may not match. In such cases, the error detection logic and/or the register rename unit may detect an error and provide a signaled error 317 (e.g., to other logic of the processor, an operating system) for further action (e.g., to attempt to correct the errors, to attempt to avoid a machine check exception, etc.).

To further illustrate, consider an example where a set of redundant bits includes a single parity bit that is generated for a corresponding physical storage location identifier. As described above, the parity bit is dependent upon the values of all bits of the corresponding physical storage location identifier (e.g., the number of set bits). For the single parity bit, if an error changes a value of any single bit, or any odd number of bits, in the physical storage location identifier, this may also change the value of the regenerated parity bit. Such non-matching values of the previously generated and newly generated parity bits may be detected as errors. However, if an error occurs that changes a value of two bits, or any even number of bits, in the corresponding physical storage location identifier, this may not change the value of the regenerated parity bit. In such a case, the previously generated and newly generated parity bits may still match, which may not allow the error to be detected.

If desired, in some embodiments, to help improve the ability to detect errors, two or more parity bits may optionally be used. As another option, in some embodiments, other types of redundant bits more robust at detecting and/or correcting errors may optionally be used. In some embodiments, the error detection logic may also be able to use the redundant bits (e.g., error correction bits) to correct an error. Moreover, if desired, in some embodiments, physical and/or logical bit interleaving may optionally be used to help improve the ability to detect errors. By way of example, with physical interleaving, a set of one or more redundant bits may correspond to (e.g., be generated from) bits of a physical storage location identifier that have been physically interleaved with bits of one or more other physical storage location identifiers so that the bits of the physical storage location identifier from which the set of redundant bits are generated are not all physically next to one another. As an example, in logical interleaving, each of two or more redundant bits may correspond to (e.g., be generated from) a different logically interleaved subset of bits of a physical storage location identifier. Physical and/or logical interleaving may tend to help reduce the chances that a cosmic particle flips two adjacent bits used to generate the same set of redundant bits, for example.

It is generally desirable to be able to detect such errors in the physical storage location identifiers. For example, in some cases, if such errors are not detected, they may cause a machine check exception and/or a system crash. In other cases, if such errors are not detected, they may potentially cause erroneous results or compromise functional correctness without any warning and/or cause silent data corruption (SDC). For example, an error in a physical storage location identifier may lead to a dataflow violation in which an instruction is caused to incorrectly depend on the wrong input data. As another example, an error in a physical storage location identifier may lead to a dataflow violation, in which an instruction is caused to incorrectly overwrite another instruction's output, before the register has been read by its dependent instructions. In addition, certain implementations may impose relatively strict target error rates for different types of errors. For example, this may be the case for server implementations (e.g., large scale data centers), mission critical implementations, and functional safety certified implementations (e.g., automotive applications). However, the detection of such errors may help to avoid such problems. For example, in some cases, if such errors are detected, firmware of the processor and/or an operating system may be able to correct the errors. In other cases, if such errors are detected, firmware of the processor and/or an operating system may be able to handle the errors so they do not cause a machine check exception and/or a system crash. In still other cases, if such errors are detected, firmware of the processor and/or an operating system may be able to handle the errors so they do not cause erroneous results or compromise functional correctness. The ability to detect such errors may also help to reduce debug time and/or effort.

In the illustrated embodiment, the sets of redundant bits are not provided to the scheduler unit 326. However, in an alternate embodiment, the sets of redundant bits may also optionally be provided to the scheduler unit along with the output physical storage location identifiers 318. In such embodiments, the scheduler unit may be operative to store (e.g., have a field, entry, or other portion to store) the sets of redundant bits. In such embodiments, the scheduler unit may also be operative to use the sets of redundant bits to detect errors in the corresponding physical storage location identifiers. Approaches similar to those described for the error detection logic 342 may optionally be used. Moreover, it is also possible for the error detection logic 342 to be included in the scheduler instead of and/or in addition to the register rename unit.

Figure 4:
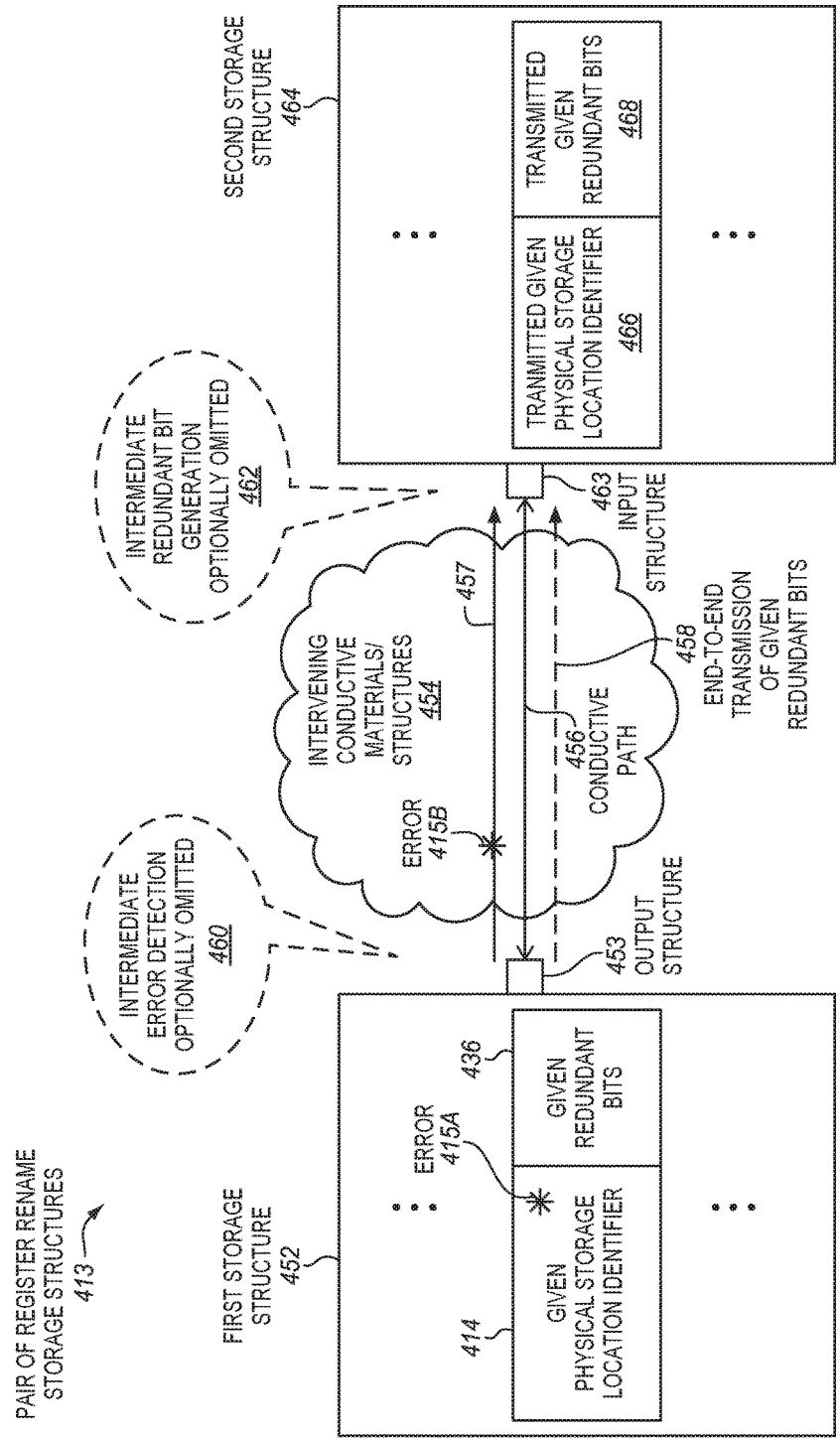
FIG. 4 is a block diagram of an embodiment of a pair of register rename storage structures that are operative to perform end-to-end transmission of a set of one or more redundant bits on a conductive path between the pair of register rename storage structures.

FIG. 4 is a block diagram of an embodiment of a pair of register rename storage structures 413 that are operative to perform end-to-end transmission 458 of a given set of one or more redundant bits 436 for a corresponding given physical storage location identifier 414 on a conductive path 456 between the pair of register rename storage structures. In some embodiments, the pair of register rename storage structures may optionally be included in the register rename unit 112 of FIG. 1 and/or the register rename unit 212 of FIG. 2 and/or the register rename unit 312 of FIG. 3. Alternatively, the pair of register rename storage structures 413 may optionally be included in a similar or different processor or other apparatus. Moreover, the register rename units of FIGS. 1-3 may each optionally either include or omit the pair of register rename storage structures 413.

The pair of register rename storage structures 413 includes a first register rename storage structure 452 and a second register rename storage structure 464. The first and second register rename storage structures may also be referred to herein simply as storage structures. Each of the first and second storage structures may be operative to store (e.g., may have fields, entries, or other portions to store) physical storage location identifiers, and corresponding sets of redundant bits. As shown, the first storage structure may be operative to store at least a given physical storage location identifier 414, and a corresponding given set of redundant bits 436. Any of the different types of redundant bits described elsewhere herein are suitable.

The first and second storage structures may represent any of various array storage structures, table storage structures, first in, first out (FIFO) storage structures, circular buffer storage structures, direct mapped table storage structures, or other storage structures, which are used to store the physical storage location identifiers at different points in register renaming. For example, in some embodiments where register renaming is optionally performed using a merged rename and architectural register file, the first and second storage structures may represent various different pairs of storage structures selected from a free list storage structure, a register map storage structure (e.g., a register alias table, a register status table of the Tomasulo algorithm), a reclamation table storage structure (e.g., a post retirement reclamation table (PRRT)), a register history table storage structure, a checkpoint table storage structure, and/or other reorder buffer (ROB) assist storage structures, which exchange physical storage location identifiers between each other. Alternatively, in other embodiments where register renaming is optionally performed using a ROB and a set of architectural registers, or a rename buffer and a set of architectural registers, the first and second storage structures may represent various other pairs of storage structures, which exchange physical storage location identifiers between each other.

The first and second storage structures are coupled by an intervening conductive path 456. As part of register renaming, the first storage structure may be operative to perform an end-to-end transmission 457 of the given physical storage location identifier 414 from the first storage structure to the second storage structure over the conductive path. In some embodiments, the first storage structure may also be operative to perform an end-to-end transmission 458 of the corresponding given set of one or more redundant bits 436 from the first storage structure to the second storage structure over the conductive path. The second storage structure 464 may receive and store the transmitted given physical storage location identifier 466, and the corresponding transmitted given set of one or more redundant bits 468. In some embodiments, a bus or other interconnect (not shown) of the conductive path may be widened by one or more bit channels to accommodate the one or more additional redundant bits, although the scope of the invention is not so limited. For example, the bus or other interconnect may include one or more bit channels dedicated to the transmission of one or more redundant bits.

The conductive path 456 may include and/or go through various types of intervening conductive materials and/or structures 454 that are used to conduct and/or support the transmission of bits and/or signals (e.g., physical storage location identifiers, redundant bits, etc.) from the first storage structure to the second storage structure. Examples of such materials and/or structures include, but are not limited to, one or more buses or other interconnects, latches, sequential logic, combinational logic, circuitry, and the like. A more detailed understanding of these materials and/or structures is not required to understand the present disclosure. Mainly, it is worth mentioning that errors (e.g., an error 415B) may potentially occur in the physical storage location identifiers when they are being transmitted anywhere along the conductive path 457 (e.g., in the intervening conductive materials and/or structures 454). Such errors may occur in addition to and/or instead of errors (e.g., an error 415A) that may potentially occur in the physical storage location identifiers while they are stored in the storage structures.

Advantageously, the end-to-end transmission 458 of the given set of one or more redundant bits 436 from the first storage structure to the second storage structure over the conductive path, along with the corresponding given physical storage location identifier, may help to allow errors that occur in the given physical storage location identifier and/or the given set of one or more redundant bits along the conductive path (e.g., the error 415B) to be detected. That is, errors that occur in the intervening conductive materials and/or structures 454 anywhere along the conductive path may potentially be detected if they make the given physical storage location identifier and the corresponding given set of one or more redundant bits inconsistent with one another. This may help to achieve end-to-end detection of errors that occur not only in the storage structures themselves but also anywhere along the intervening conductive paths between storage structures.

In some embodiments, as shown at first callout 462, since the already generated given set of the redundant bits 436 are transmitted end-to-end 458 from the first to the second storage structure, intermediate redundant bit generation may optionally be omitted. There is no requirement to include redundant bit generation logic to regenerate the given set of redundant bits between the first and second storage structures and/or between the time the given set of redundant bits is read from the first storage structure and the time the given set of redundant bits is stored in the second storage structure. In some embodiments, there may optionally be no redundant bit generation logic directly connected or coupled on the intervening conductive path coupling the first and second storage structures. Advantageously, omitting such redundant bit generation logic may help reduce the overall amount of logic, which in turn may help to reduce power consumption and/or manufacturing cost. Moreover, this may help to avoid needing to regenerate the given set of the redundant bits on the write access or path to the second storage structure. The ability to omit such regeneration of redundant bits may help to avoid adding an additional operation that takes time on this write access or path that already tends to have relatively strict timing constraints. Also, as mentioned above, since the already generated given set of the redundant bits 436 are transmitted end-to-end 458 from the first to the second storage structure, errors that occur anywhere during this transmission may be detected, which may not be possible if the redundant bits were not transmitted end-to-end. Alternatively, in other embodiments, intermediate redundant bit generation logic may optionally be included if desired.

In some embodiments, as shown at first callout 460, intermediate error detection may optionally be omitted. There is no requirement to perform error detection on the given physical storage location identifier using the given corresponding set of the redundant bits between the first and second storage structures and/or between the time the given set of redundant bits is read from the first storage structure and the time the given set of redundant bits is stored in the second storage structure. In some embodiments, there may optionally be no error detection logic directly connected or coupled on the intervening conductive path coupling the first and second storage structures. Advantageously, omitting such intermediate error detection logic may help reduce the overall amount of logic, which in turn may help to reduce power consumption and/or manufacturing cost. Moreover, this may help to avoid needing to perform such error detection on the write access or path to the second storage structure. Rather, in some embodiments, the error detection may optionally primarily and/or only be performed on the conductive path leading from the register rename unit to the scheduler unit (e.g., 226 or 326) and/or prior to physical storage location identifiers being used by the scheduler unit. Alternatively, in other embodiments, intermediate error detection logic may optionally be included if desired. For example, intermediate error detection logic may optionally be included to detect errors that occur while the physical storage location identifiers are stored within the first storage structure and/or along the path leading from the first storage structure to the error detection logic.

Figure 5:
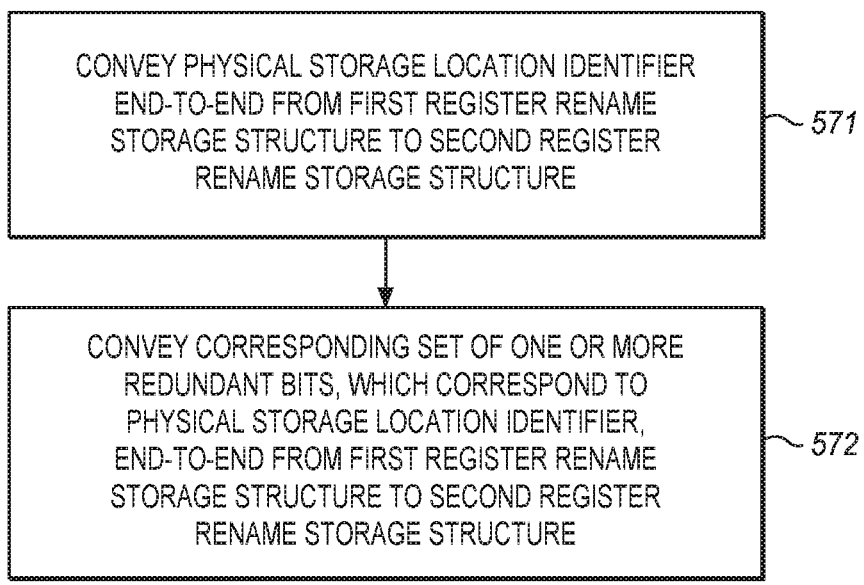
FIG. 5 is a block flow diagram of an embodiment of a method of conveying physical storage location identifiers and corresponding set of redundant bits between register rename storage structures.

FIG. 5 is a block flow diagram of an embodiment of a method 570 of conveying physical storage location identifiers and redundant bits between register rename storage structures. In various embodiments, the method may be performed by register rename unit, a processor, or an integrated circuit. In various embodiments, the method 570 may be performed by and/or with the processor 102 of FIG. 1 and/or the processor 202 of FIG. 2 and/or the processor 302 of FIG. 3 and/or in a register rename unit having pair of register rename storage structures 413 of FIG. 4. The components, features, and specific optional details described herein for the processor 102 and/or the processor 202 and/or the processor 302 and/or in the pair of register rename storage structures 413 also optionally apply to the method 570. Alternatively, the method 570 may be performed by and/or within a similar or different processor or other apparatus. Moreover, the processor 102 and/or the processor 202 and/or the processor 302 and/or in the pair of register rename storage structures 413 may perform methods the same as, similar to, or different than the method 570.

The method includes conveying a physical storage location identifier end-to-end from a first register rename storage structure to a second register rename storage structure, at block 571. The method also includes conveying a corresponding set of one or more redundant bits, which correspond to the physical storage location identifier, end-to-end from the first register rename storage structure to the second register rename storage structure, at block 572.

In some embodiments, the method may include outputting the set of redundant bits from the first register rename storage structure, and storing the set of redundant bits in the second register rename storage structure, without regenerating the set of redundant bits between a time when the set of redundant bits are output from the first register rename storage structure, and a time when the set of redundant bits are stored in the second register rename storage structure. In some embodiments, the method may include outputting the set of redundant bits from the first register rename storage structure, and storing the set of redundant bits in the second register rename storage structure without performing error detection using the set of redundant bits between a time the set of redundant bits are output from the first register rename storage structure and a time the set of redundant bits are stored in the second register rename storage structure. In some embodiments, the method may include providing the physical storage location identifier, and the set of redundant bits, to error detection logic, when providing the physical storage location identifier to a scheduler unit and/or before the scheduler unit uses them.

Figure 6:
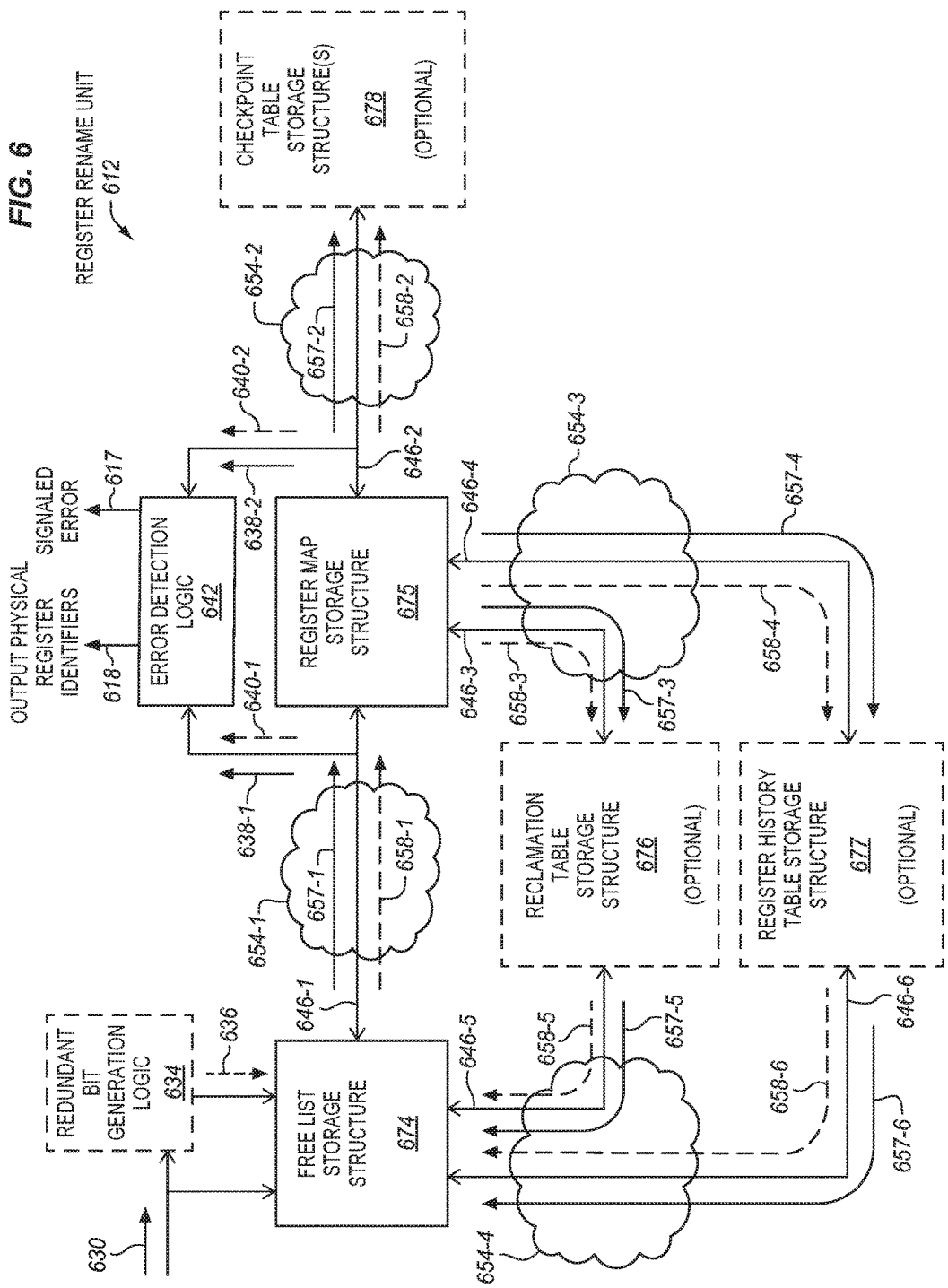
FIG. 6 is a block diagram of a detailed example embodiment of a register rename unit, which is suitable for performing register renaming through a merged rename and architectural register file, and which is operative to detect errors in physical storage location identifiers.

FIGS. 5-6 illustrate conveying redundant bits with their corresponding physical storage location identifiers end-to-end between a pair of register rename storage structures. While this is useful and beneficial, often more benefit can be realized by extending the approach to conveying the redundant bits with their corresponding physical storage location identifiers between at least three register rename storage structures, or in full recirculating loops around the complete set of register rename storage structures that are to contain the complete set of physical storage location identifiers. For example, redundant bits and their corresponding register identifiers may optionally be conveyed in end to end as the register identifiers flow or circle around a free list storage structure, a register map storage structure and a reclamation table storage structure. While the scope of the invention is not limited to such extensions, further details of one possible example of such an extension will be shown and described for FIG. 6.

FIG. 6 is a block diagram of a detailed example embodiment of a register rename unit 612, which is suitable for performing register renaming through a merged rename and architectural register file, and which is operative to detect errors in physical storage location identifiers. In some embodiments, the register rename unit 612 may be included in the processor 102 of FIG. 1 and/or the processor 202 of FIG. 2 and/or the processor 302 of FIG. 3. Alternatively, the register rename unit 612 may be included in a similar or different processor or other apparatus. Moreover, the processors of FIGS. 1-3 may include similar or different register rename units than the register rename unit 612.

The register rename unit 612 includes a free list storage structure 674. When register renaming is performed with a merged rename and architectural register file, a set of physical registers (not shown), typically larger in number than the number of architectural registers being renamed, may be used. All the physical registers may initially be "free" or available to be allocated for use in register renaming. Initially, a complete set of the physical register indices or other physical register identifiers 630 for the entire set of physical registers in the merged rename and architectural register file, which are all initially free, may be stored into the free list storage structure. By way of example, this may happen prior to register renaming (e.g., at boot, reset, initialization, or restart). Each physical register identifier may uniquely indicate or identify one of the physical registers. The number of bits used for each physical register identifier may depend upon the number of physical registers to be indexed or selected among. By way of example, an identifier of 6-bits may select any one of up to sixty-four registers, an identifier of 9-bits may select any one of up to five hundred and twelve registers, and so on. By way of example, the free list storage structure may be implemented as a first in, first out (FIFO) storage structure, a circular buffer storage structure, a table storage structure, array storage structure, or other suitable storage structure.

In the illustrated embodiment, the register rename unit optionally includes redundant bit generation logic 634, although this is not required. The redundant bit generation logic may be operative to generate a corresponding set of redundant bits 636 for each of the physical register identifiers 630 stored into the free list storage structure. This may optionally be done as previously described. In some embodiments, this may be done when the complete set of physical register identifiers 630 is initially stored into the free list storage structure (e.g., at boot, reset, initialization, restart, or the like). In other embodiments, the redundant bit generation logic may optionally be outside of the register rename unit as previously described.

As instructions are performed that have destination architectural registers to be renamed, the free list storage structure 674 may select free physical register identifiers, and allocate them to rename those destination architectural registers. If there are currently no free physical registers, the renaming process may be stalled temporarily until an older instruction commits, thereby freeing a physical register (e.g., from a reclamation table storage structure 676). The allocated physical register identifiers may be transmitted or otherwise provided end-to-end 657-1 from the free list storage structure to a register map storage structure 675. Also, in some embodiments, a corresponding set of one or more redundant bits may be transmitted or otherwise provided end-to-end 658-1 from the free list storage structure to the register map storage structure. The register map storage structure may be coupled with the free list storage structure by a first conductive path 646-1 through a first set of intervening conductive materials and/or structures 654-1.

The register map storage structure may be operative to store the most current mappings of physical register identifiers to their corresponding destination architectural registers, as well as the received corresponding sets of redundant bits. By way of example, the register map storage structure may include a different entry for each of the architectural registers that is to be renamed, and the physical register identifiers mapped to the architectural registers, as well as the corresponding sets of redundant bits, may be stored in the corresponding entries, although other configurations are also possible. Examples of suitable register map storage structures include, but are not limited to, a register alias table (RAT), a register status table (e.g., as used in the Tomasulo algorithm), a direct mapped table storage structure, a direct mapped array storage structure, or other suitable storage structure.

The allocated physical register identifiers may also be transmitted or provided 638-1 from the free list storage structure to error detection logic 642. In some embodiments, the corresponding sets of redundant bits may also be transmitted or provided 640-1 from the free list storage structure to the error detection logic. The error detection logic may be operative to perform error detection on the physical register identifiers with the corresponding sets of redundant bits, as described elsewhere herein. The error detection logic may provide output physical register identifiers 618 (e.g., to a scheduler unit such as scheduler unit 226 or 326) if no error is detected, or may provide a signaled error 617 if an error is detected.

The register map storage structure 675 may be consulted, during the register rename pipeline stage, to determine physical registers that are mapped to source architectural registers that are indicated by instructions being performed. The selected physical register identifiers may then be transmitted or otherwise provided 638-2 from the register map storage structure to the error detection logic 642. In some embodiments, the corresponding sets of redundant bits may also be transmitted or otherwise provided 640-2 from the register map storage structure to the error detection logic. The error detection logic may perform error detection on the received physical register identifiers with their corresponding sets of redundant bits, as described elsewhere herein. The error detection logic may either output the physical register identifiers 618 (e.g., to a scheduler unit such as scheduler unit 226 or 326) or provide a signaled error 617 if an error is detected.

In one aspect, each entry in the register map storage structure may also store a readiness indication (e.g., a readiness bit). The readiness indication may indicate "not ready" if a queued instruction that will write to the destination physical register has not yet been performed, or may indicate "ready" if a value has already been stored to the destination physical register. When the instructions are executed by the execution units, the physical register identifiers used to store their results or destination operands may be broadcast on a bus or other interconnect. The register map storage structure may monitor the interconnect for the destination physical register identifiers. When matches are detected, the register map storage structure may configure the readiness indications to indicate that the physical registers are ready.

As mentioned above, free/available physical registers may be allocated from the free list storage structure for destination architectural registers for instructions being performed. However, because the number of physical registers is finite, it is not possible to allocate additional free/available physical registers from the free list storage structure indefinitely for register renaming, without being able to free or recapture the previously allocated physical registers (e.g., because eventually there will be no more free/available physical registers to allocate). One approach that may be used to free or recapture physical registers previously allocated for earlier/prior instructions is based on the architectural registers that they are mapped to being overwritten by committed later/subsequent instructions.

Consider for example an earlier/prior instruction in original program order that writes to a given destination architectural register (e.g., R8), and a later/subsequent instruction in original program order that also writes to the given destination architectural register (e.g., R8). Initially, a first physical register (e.g., P3) may be allocated from the free list storage structure to rename the given destination architectural register (e.g., R8) for the earlier/prior instruction. This mapping of the first physical register (e.g., P3) to the given destination architectural register (e.g., R8) may be stored or preserved in the register map storage structure. Subsequently, for the later/subsequent instruction, a second different physical register (e.g., P4) may be allocated from the free list storage structure to rename the given destination architectural register (e.g., R8). This updated mapping of the second different physical register (e.g., P4) to the given destination architectural register (e.g., R8) may be stored or preserved in the register map storage structure. The prior mapping of the first physical register (e.g., P3) to the given destination architectural register (e.g., R8) is no longer the most current mapping, and it may be removed from the register map storage structure.

However, it may be desirable to preserve this mapping so that other instructions may read the earlier value stored in the first physical register (e.g., P3). In the illustrated example embodiment, this prior mapping (e.g., the physical register identifier and optionally the mapped architectural register identifier) may be transmitted or otherwise provided end-to-end 657-3 from the register map storage structure to the reclamation table storage structure 676. In some embodiments, the corresponding set of redundant bits may also be transmitted or otherwise provided end-to-end 658-3 from the register map storage structure to the reclamation table storage structure. The register map storage structure, and the reclamation table storage structure, may be coupled by a third conductive path 646-3, through a third set of intervening conductive materials and/or structures 654-3. The reclamation table storage structure may be used to store such mappings that have been displaced from the register map storage structure. Specific examples of suitable reclamation table storage structures include, but are not limited to, a post retirement reclamation table storage structure (PRRT), a ROB (e.g., having fields for this purpose), or other ROB assist structures, although the scope of the invention is not so limited.

The mappings that have been displaced from the register map storage structure 675 may be stored in the reclamation table storage structure until the instructions that caused the displacement retire or otherwise commit. For example, the first physical register (e.g., P3) previously mapped to the given destination architectural register (e.g., R8) for the earlier/prior instruction may safely be regarded as no longer needed when the later/subsequent instruction that stored data to the same given destination architectural register (e.g., R8) commits. At this point, the previous value in that given architectural register is no longer needed (e.g., no instruction will use that prior value), and the previously mapped physical register may be freed or recaptured. Specifically, the previously mapped physical register identifier may be transmitted or otherwise provided end-to-end 657-5 from the reclamation table storage structure to the free list storage structure. Likewise, in some embodiments, the corresponding set of redundant bits may be transmitted or otherwise provided end-to-end 658-5 from the reclamation table storage structure to the free list storage structure. The reclamation table storage structure may be coupled to the free list storage structure by a fifth conductive path 646-5 through a fourth set of intervening conductive materials and/or structures 654-4.

Under certain conditions it may be appropriate to roll back or rewind the state of the register rename unit 612 (e.g., the register map storage structure 675) to an earlier point in time. For example, this may be the case when there is an exception, a branch miss-prediction, a pipeline rollback, a clear, a nuke, or the like. In some embodiments, the register rename unit may optionally include one or more checkpoint table storage structures 678, although this is not required. As shown, the checkpoint table storage structure(s) may be coupled with the register map storage structure by a second intervening conductive path 646-2 through a second set of intervening conductive materials and/or structures 654-2. The mappings of physical register identifiers to architectural registers stored in the register map storage structure be checkpointed or stored at appropriate times to the one or more checkpoint table storage structures. This may include transmitting or otherwise providing end-to-end 657-2 physical register identifiers from the register map storage structure to the checkpoint table storage structure(s). In some embodiments, this may also include transmitting or otherwise providing end-to-end 658-2 the corresponding sets of redundant bits from the register map storage structure to the checkpoint table storage structure(s).

In some embodiments, the register rename unit may optionally include a register history table storage structure 677, although this is not required. As shown, the register history table storage structure may be coupled with the register map storage structure by a fourth conductive path 646-4. Mappings of physical register identifiers to architectural registers may be transmitted or otherwise provided end-to-end 657-4 from the register map storage structure to the register history table storage structure to compliment the checkpoints. Likewise, in some embodiments, the corresponding sets of redundant bits may be transmitted or provided end-to-end 658-4 from the register map storage structure to the register history table storage structure. The checkpointed mappings stored in the checkpoint table storage structure(s), and the additional mappings stored in the register history table storage structure, may together be used to rollback or rewind the state of the register map storage structure to an earlier point in time when needed. For example, the checkpointed state (e.g., just prior to a point of time to roll back to) may be obtained from the checkpoint table storage structure(s), and then mappings obtained from the register history table storage structure may be cycled replayed to get to the state of the register map storage structure at the time of the last valid instruction.

Advantageously, in some embodiments, due in part to the end-to-end transmission of the sets of redundant bits along with the physical register identifiers between the storage structures, errors that may occur anywhere along these conductive paths may generally be detected as they cause the redundant bits to become inconsistent with the physical register identifiers. In the illustrated embodiment, the register rename unit optionally does not perform intermediate redundant bit generation and optionally does not include intermediate redundant bit generation logic on the conductive paths coupling the various register rename storage structures. Rather, in some embodiments, already generated redundant bits are transmitted or propagated end-to-end without intermediate regeneration when being exchanged variously between the various storage structures as described above. Advantageously, omitting such redundant bit regeneration logic may help to reduce die size, power consumption and/or manufacturing cost. Also, there is no need to perform such redundant bit regeneration on the write accesses or paths into the various storage structures, which often tend to have relatively strict timing constraints.

Also, in the illustrated embodiment, the error detection logic 642 is connected or coupled on a conductive path from the register rename unit leading to a scheduling unit. This may help to allow error detection at this point before erroneous physical register identifiers are used by a scheduler and/or execution unit. However, the register rename unit optionally does not perform intermediate error detection and optionally does not include intermediate error detection logic on the conductive paths coupling the various register rename storage structures. Advantageously, omitting such redundant bit regeneration logic may help to reduce die size, power consumption and/or manufacturing cost. Also, there is no need to perform such error detection on the write accesses or paths into the various storage structures, which often tend to have relatively strict timing constraints.

It is to be appreciated that this is just one illustrative example of a suitable register rename unit, and that the scope of the invention is not limited to this particular register rename unit. For example, the reclamation table storage structure, the checkpoint table storage structure(s), and the register history table storage structure, are optional not required. In other embodiments, the checkpoint table storage structure(s) may optionally be omitted. For example, this may be the case if the processor is to perform branch resolution in order when the branch instructions are the oldest non-committed instructions. Also, in other embodiments, instead of the reclamation table storage structure and the register history table storage structure, other storage structures may optionally be used instead, such as, for example, a reorder buffer (ROB). Also, in other embodiments, redundant bits need not be transmitted end-to-end between all storage structures of the register rename unit. Rather, in some embodiments, redundant bits may be transmitted end-to-end between a single pair, or a subset of pairs, of the storage structures of the register rename unit. Although this may not provide full error detection capabilities throughout the register rename unit, it may nevertheless provide some additional useful error detection. As one example, the register map storage structure 675 may store redundant bits for the register specifiers whereas the checkpoint table storage structure(s) 678 may not. When register specifiers are read from the checkpoint table storage structure(s) 678 into the register map storage structure 675 their redundant bits may be regenerated and stored in the register map storage structure 675. While this may not allow errors in the register specifiers while they are stored in the checkpoint table storage structure(s) to be detected, it nevertheless may allow errors in the register specifiers while stored in the register map storage structure to be detected. Additionally, if desired, the redundant bit regeneration may optionally be performed near the output of the checkpoint table storage structure(s) to be able to detect errors that occur on most or at least some of the conductive path coupling the checkpoint table storage structure(s) with the register map storage structure.

In still other embodiments, the register rename unit may optionally be included in a processor that supports transactional execution. In such embodiments, the register rename unit may optionally include a storage structure to provide support for transactional execution or memory. For example, a Copy on Write (COW) table or other storage structure (not shown) may optionally be included to save previous destination physical register identifiers for architectural destination registers on the first write to the architectural register after a transaction begins. In some embodiments, the physical register identifiers and the corresponding sets of redundant bits may also be transmitted or otherwise provided end-to-end to the COW storage structure and stored therein. The COW storage structure may be used to recover the register map storage structure in the event of a transaction abort or to update the free list storage structure when the transaction ends successfully. In other embodiments, the register rename unit may optionally be used in a processor that does not support transactional execution and/or even if the COW or other storage structure exists the redundant bit protections may optionally not be extended to such a storage structure.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 7:
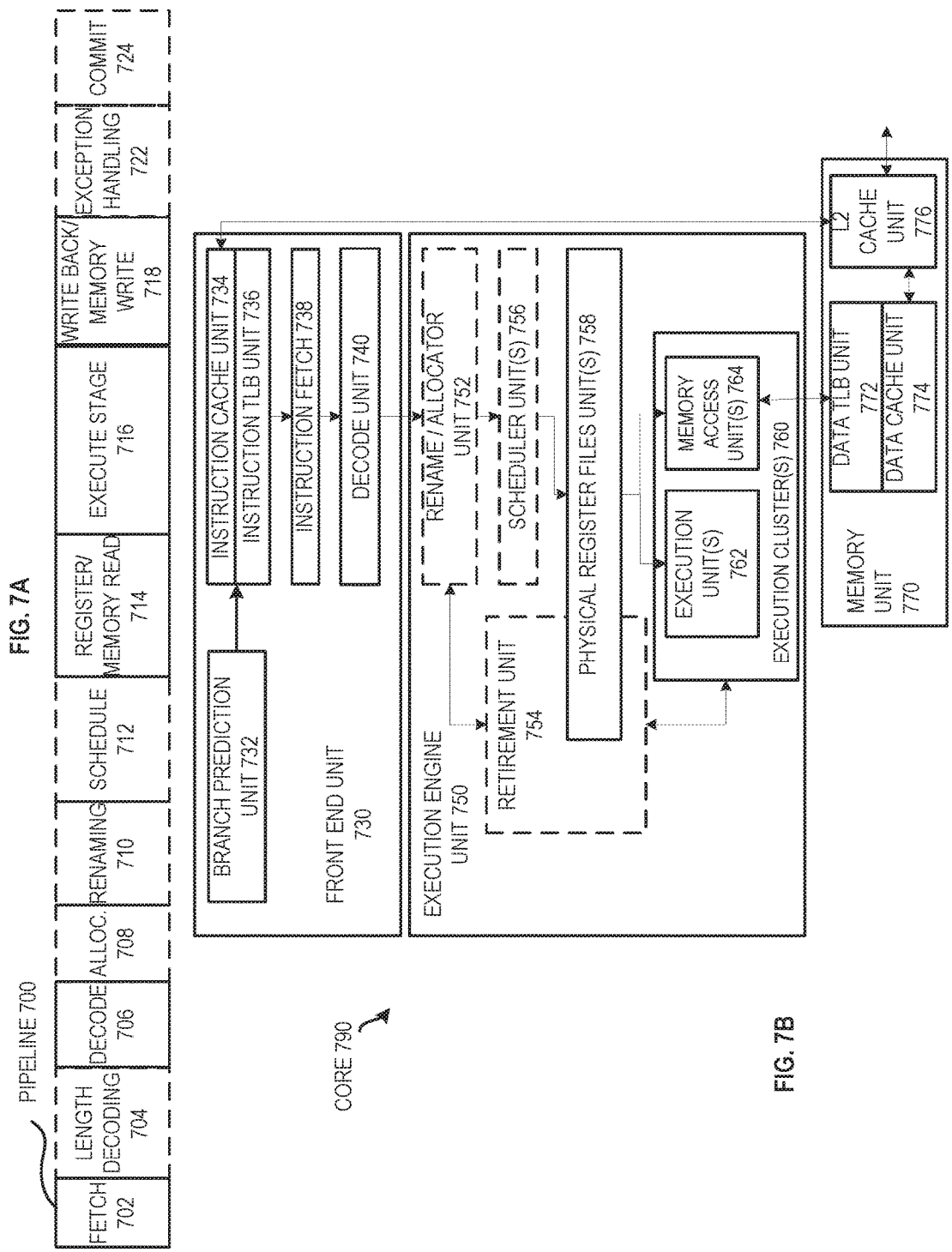
FIG. 7A is a block diagram illustrating an embodiment of an in-order pipeline and an embodiment of a register renaming out-of-order issue/execution pipeline.
FIG. 7B is a block diagram of an embodiment of processor core including a front end unit coupled to an execution engine unit and both coupled to a memory unit.

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type.

As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8:
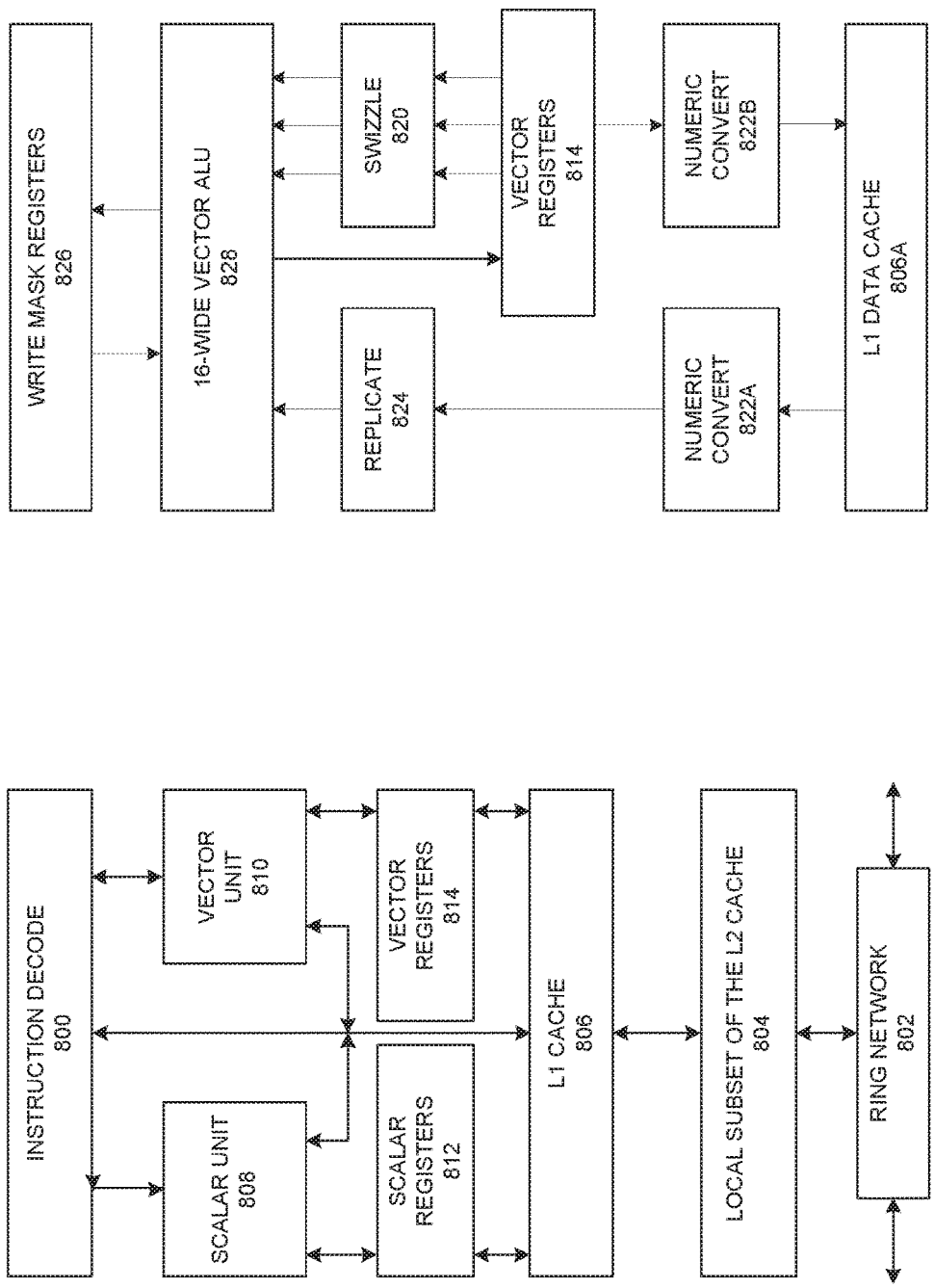
FIG. 8A is a block diagram of an embodiment of a single processor core, along with its connection to the on-die interconnect network, and with its local subset of the Level 2 (L2) cache.
FIG. 8B is a block diagram of an embodiment of an expanded view of part of the processor core of FIG. 8A.

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
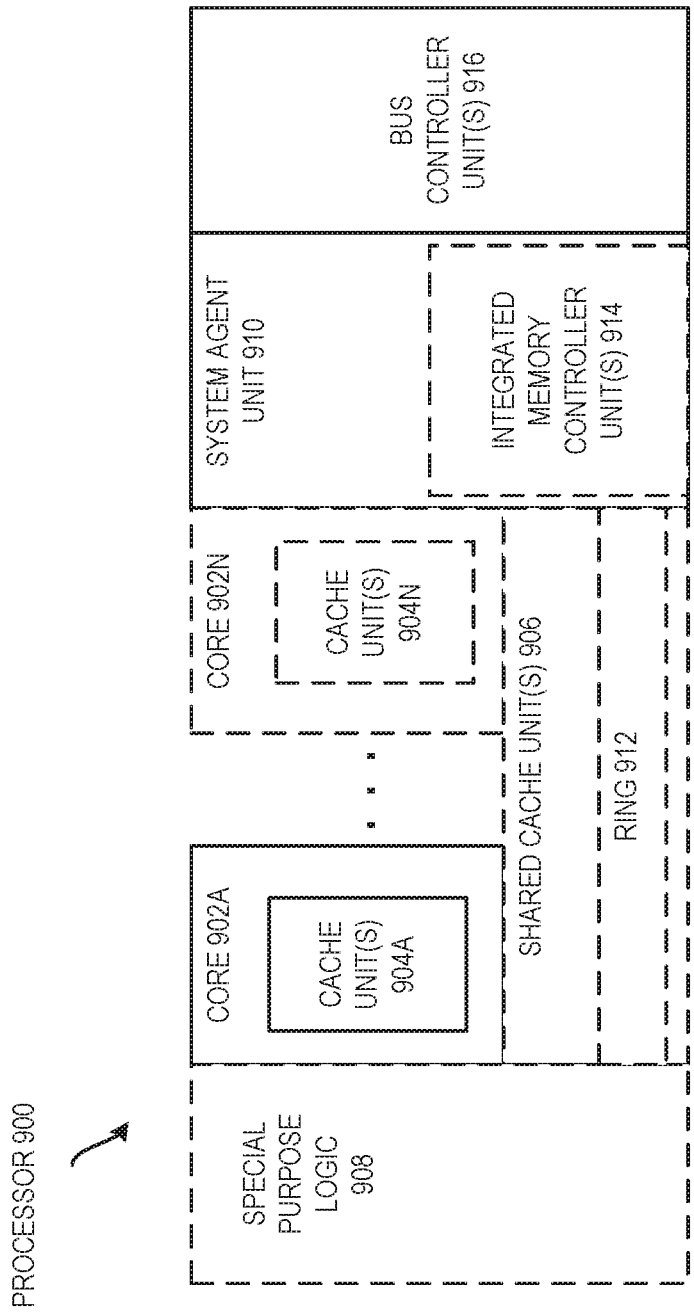
FIG. 9 is a block diagram of an embodiment of a processor that may have more than one core, may have an integrated memory controller, and may have integrated graphics.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
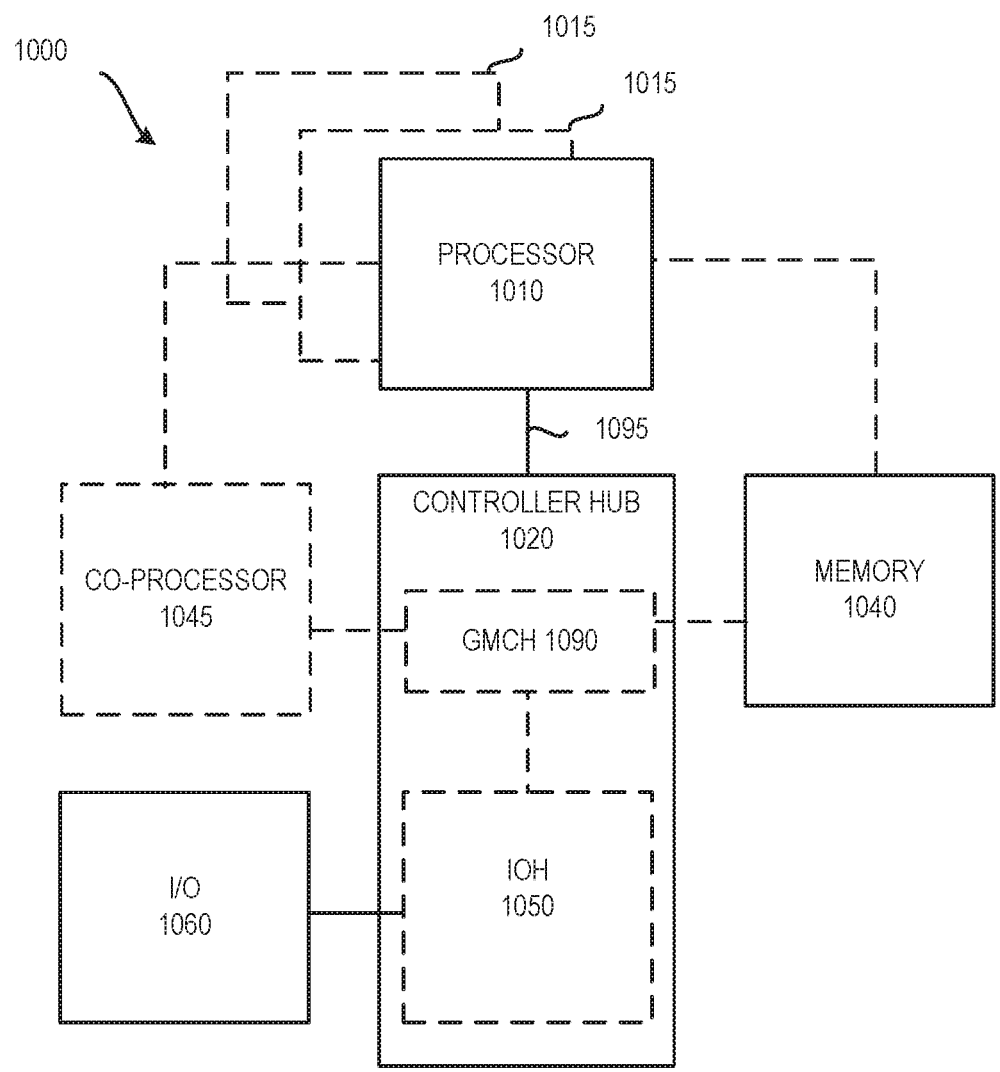
FIG. 10 is a block diagram of a first embodiment of a computer architecture.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
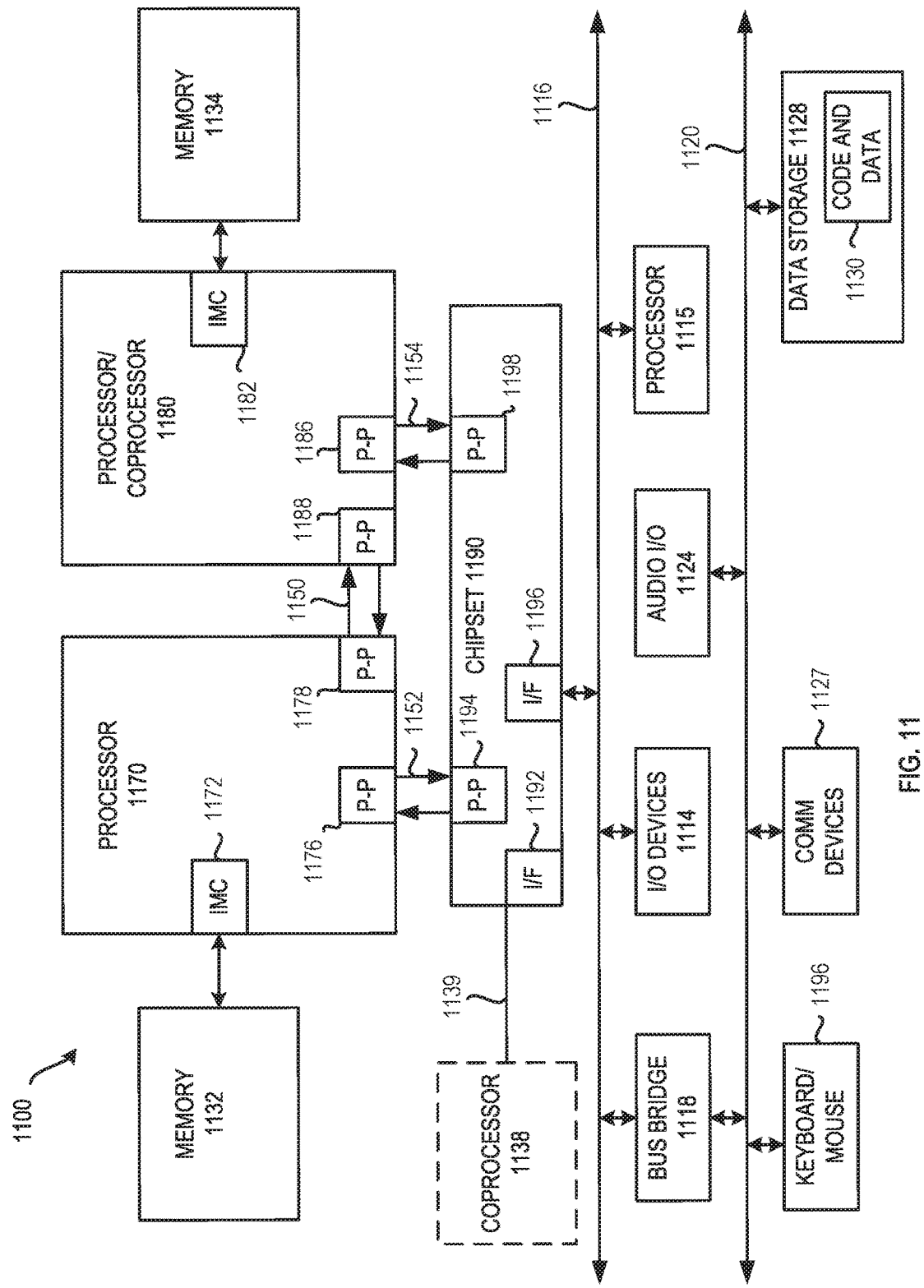
FIG. 11 is a block diagram of a second embodiment of a computer architecture.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
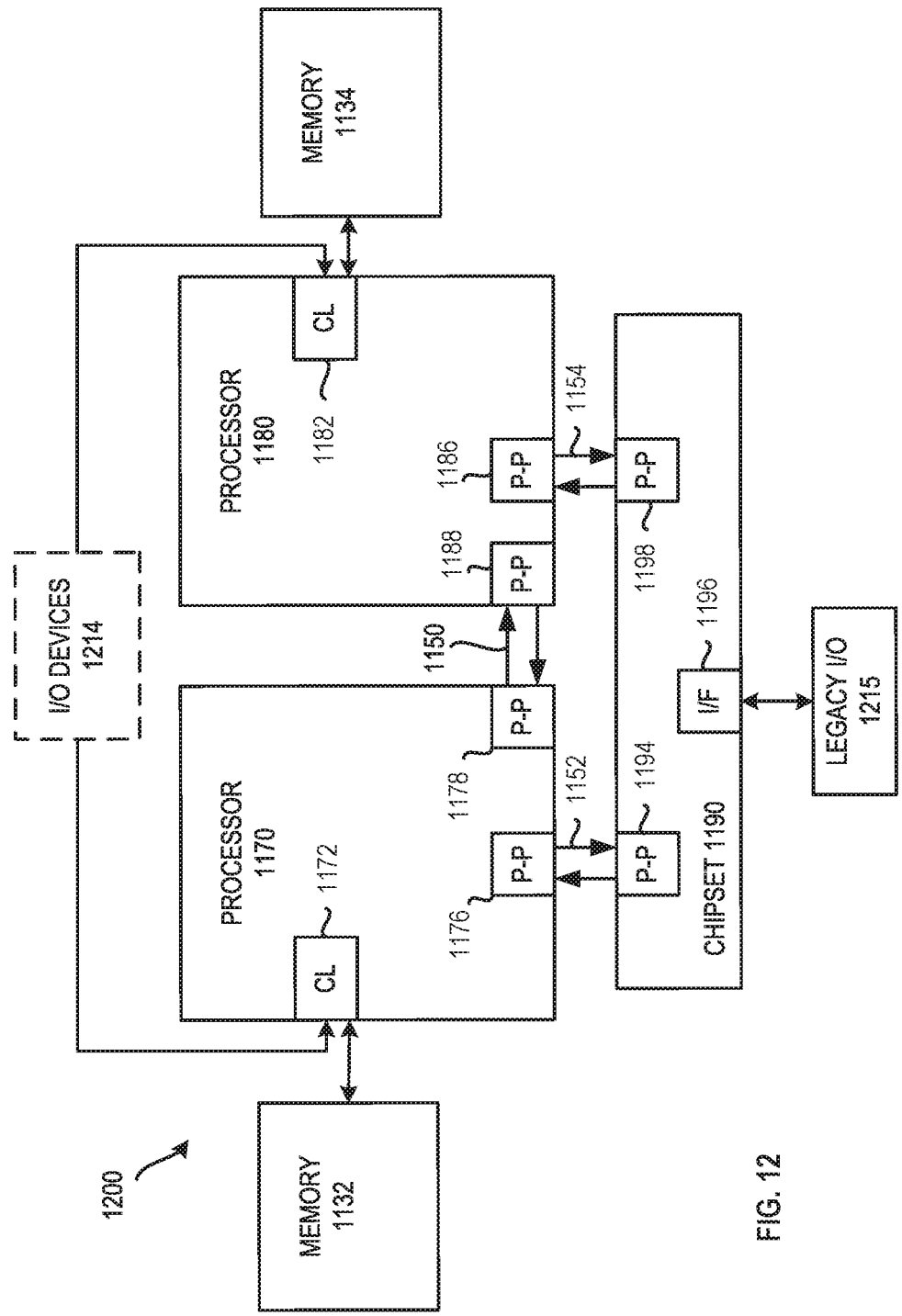
FIG. 12 is a block diagram of a third embodiment of a computer architecture.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
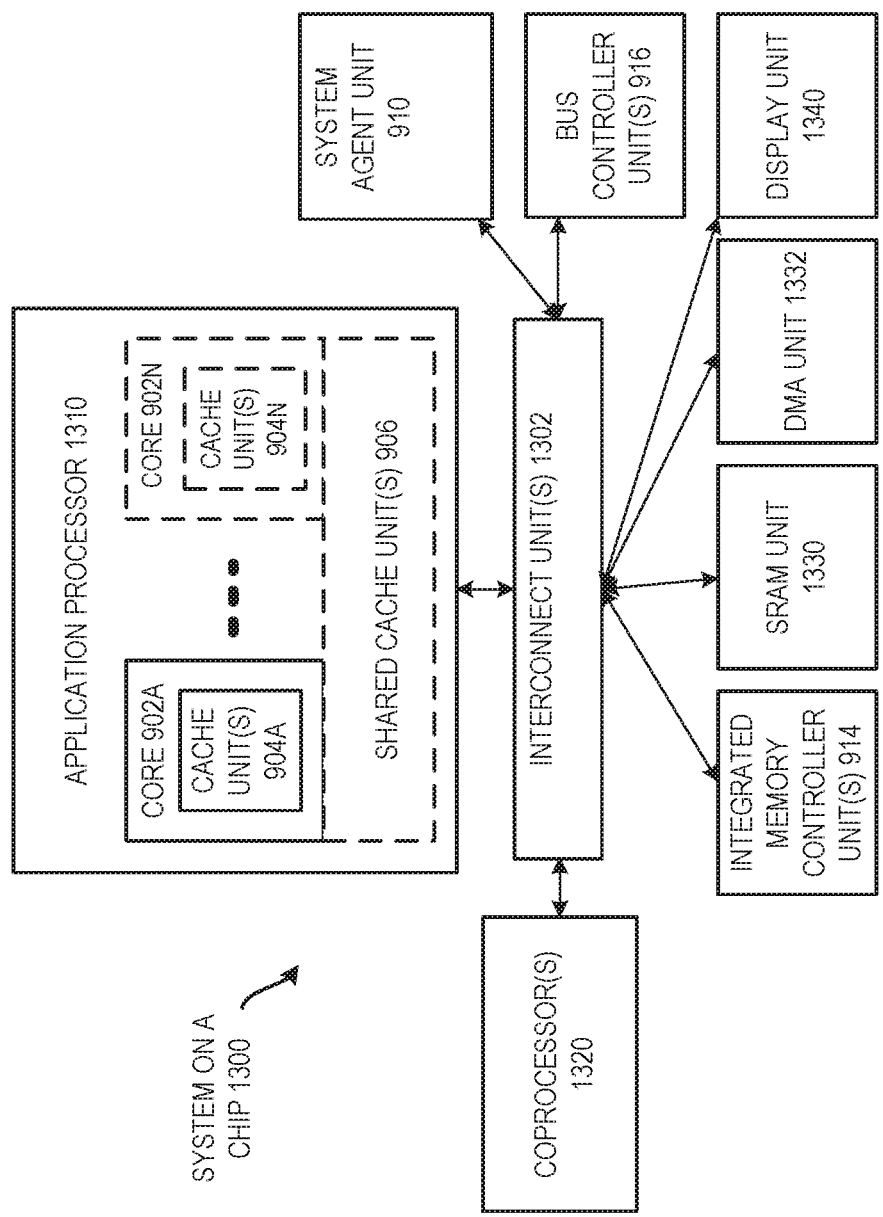
FIG. 13 is a block diagram of an embodiment of a system-on-a-chip architecture.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
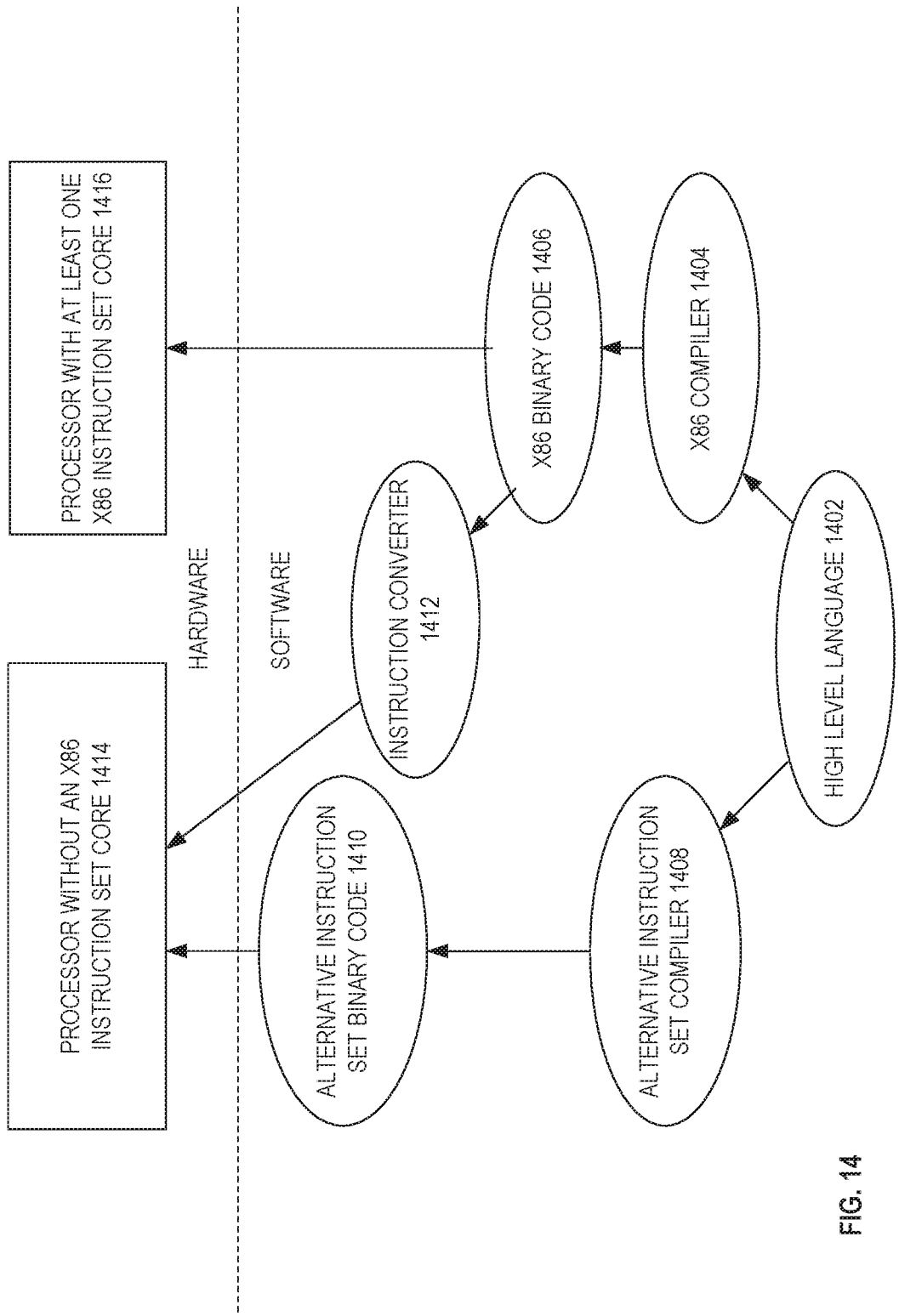
FIG. 14 is a block diagram of use of a software instruction converter to convert binary instructions in a source instruction set to binary instructions in a target instruction set, according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Components, features, and details described for any of FIGS. 1-3 and 6 may also optionally apply to either of FIGS. 4-5. Components, features, and details described for any of the register rename units disclosed herein may optionally apply to any of the methods disclosed herein, which in embodiments may optionally be performed by and/or with such register rename units. Any of the register rename units disclosed herein in embodiments may optionally be included in any of the processors disclosed herein in any of the systems disclosed herein (e.g., any of the systems of FIGS. 10-13).

Processor components disclosed herein may be said to be operative, configured, capable, or able to perform an operation, or may be said to perform the operation. For example, a register rename unit may be to perform renaming. For clarity, it is to be understood that these expressions do not imply that the processor components are in operation or use, but rather refer to what the processor components are capable of doing or able to do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, storage structures may be coupled by intervening materials and/or structures. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes at least two of physical storage locations, and a register rename unit. The register rename unit includes a first register rename storage structure to store a given physical storage location identifier, and a corresponding given one or more redundant bits. The given physical storage location identifier is to identify a physical storage location of the at least two of physical storage locations. The register rename unit also includes a second register rename storage structure. The register rename unit also includes a first conductive path coupling the first and second register rename storage structures. The first conductive path is to convey the given one or more redundant bits end-to-end from the first register rename storage structure to the second register rename storage structure.

Example 2 includes the processor of Example 1, in which the register rename unit does not have redundant bit generation logic directly coupled with the first conductive path to regenerate the given one or more redundant bits from the given physical storage location identifier that is to be conveyed end-to-end from the first register rename storage structure to the second register rename storage structure.

Example 3 includes the processor of any one of Examples 1 to 2, in which the register rename unit does not have error detection logic directly coupled with the first conductive path to perform error detection using the given one or more redundant bits that is to be conveyed end-to-end from the first register rename storage structure to the second register rename storage structure.

Example 4 includes the processor of any one of Examples 1 to 3, further including error detection logic directly coupled with a second conductive path leading from the register rename unit to a scheduler unit. Also, optionally in which the error detection logic is to receive a second physical storage location identifier and a corresponding second one or more redundant bits. Also, optionally in which the error detection logic to detect an error when the second physical storage location identifier and the corresponding second one or more redundant bits are inconsistent with one another.

Example 5 includes the processor of Example 4, in which the error detection logic is able to detect an error that occurs in the second physical storage location identifier at any point along the first conductive path.

Example 6 includes the processor of any one of Examples 1 to 5, in which the first register rename storage structure includes a free list storage structure. Also, optionally further including redundant bit generation logic to generate the corresponding given one or more redundant bits when the given physical storage location identifier is stored to the free list storage structure.

Example 7 includes the processor of any one of Examples 1 to 6, in which the first storage structure includes a free list storage structure. Also, optionally in which the second storage structure includes a register map storage structure.

Example 8 includes the processor of any one of Examples 1 to 5, in which the first storage structure includes a register map storage structure. Also, optionally in which the second storage structure includes one of a checkpoint table storage structure, a reclamation table storage structure, and a register history table storage structure.

Example 9 includes the processor of any one of Examples 1 to 8, further including a third register rename storage structure. Also, optionally in which the given one or more redundant bits, and the given physical storage location identifier, are to be conveyed together from the second register rename storage structure and from the second register rename storage structure back to the first register rename storage structure.

Example 10 includes the processor of any one of Examples 1 to 9, in which the conductive path includes one or more bit channels dedicated to conveying one or more redundant bits.

Example 11 includes the processor of any one of Examples 1 to 10, in which the one or more redundant bits comprise one or more parity bits.

Example 12 includes the processor of any one of Examples 1 to 10, in which the given one or more redundant bits includes at least two redundant bits.

Example 13 includes the processor of any one of Examples 1 to 10, in which the given one or more redundant bits includes at least two of error correction bits.

Example 14 is a method performed by processor. The method includes conveying a physical storage location identifier end-to-end from a first register rename storage structure to a second register rename storage structure. The method also includes conveying a corresponding one or more redundant bits, which correspond to the physical storage location identifier, end-to-end from the first register rename storage structure to the second register rename storage structure.

Example 15 includes the method of Example 14, further including providing the physical storage location identifier and the corresponding one or more redundant bits to error detection logic when providing the physical storage location identifier to a scheduler unit.

Example 16 includes the method of any one of Examples 14 to 15, further including outputting the corresponding one or more redundant bits from the first register rename storage structure. The method also optionally includes storing the corresponding one or more redundant bits in the second register rename storage structure without regenerating the corresponding one or more redundant bits between a time the corresponding one or more redundant bits are output from the first register rename storage structure and a time the corresponding one or more redundant bits are stored in the second register rename storage structure.

Example 17 includes the method of any one of Examples 14 to 16, further including outputting the corresponding one or more redundant bits from the first register rename storage structure. The method also optionally includes storing the corresponding one or more redundant bits in the second register rename storage structure without performing error detection using the corresponding one or more redundant bits between a time the corresponding one or more redundant bits are output from the first register rename storage structure and a time the corresponding one or more redundant bits are stored in the second register rename storage structure.

Example 18 is a computer system that includes an interconnect, a dynamic random access memory (DRAM) coupled with the interconnect, and a processor coupled with the interconnect. The processor includes at least two physical storage locations, and a register rename unit. The register rename unit includes a first register rename storage structure to store a given physical storage location identifier, which is to identify a physical storage location of the at least two of physical storage locations, and a corresponding given one or more redundant bits. The register rename unit also includes a second register rename storage structure. The register rename unit also includes a first conductive path coupling the first and second register rename storage structures, the first conductive path to convey the given one or more redundant bits end-to-end from the first register rename storage structure to the second register rename storage structure.

Example 19 includes the computer system of Example 18, in which the register rename unit does not have redundant bit generation logic directly coupled with the first conductive path to regenerate the given one or more redundant bits from the given physical storage location identifier that is to be conveyed end-to-end from the first register rename storage structure to the second register rename storage structure.

Example 20 includes the computer system of any one of Examples 18 to 19, in which the register rename unit does not have error detection logic directly coupled with the first conductive path to perform error detection using the given one or more redundant bits that is to be conveyed end-to-end from the first register rename storage structure to the second register rename storage structure.

Example 21 includes the computer system of any one of Examples 18 to 20, further including error detection logic directly coupled with a second conductive path leading from the register rename unit to a scheduler unit. Also, optionally in which the error detection logic is to receive a second physical storage location identifier, and a corresponding second one or more redundant bits. Also, optionally in which the error detection logic to detect an error when the second physical storage location identifier and the corresponding second one or more redundant bits are inconsistent with one another.

Example 22 includes the processor of any one of Examples 1 to 13, further including an optional branch prediction unit to predict branches, and an optional instruction prefetch unit, coupled with the branch prediction unit, the instruction prefetch unit to prefetch instructions. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch instructions, in some cases from one of the L1 instruction cache and the L2 cache, and to provide the instructions to the decode unit. The processor may also optionally include an optional scheduler to schedule one or more operations that have been decoded from the instructions for execution, and an optional commit unit to commit execution results of the instructions.

Example 23 includes a system-on-chip that includes at least one interconnect, the processor of any one of Examples 1 to 13 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 24 is a processor or other apparatus operative to perform the method of any one of Examples 14 to 17.

Example 25 is a processor or other apparatus that includes means for performing the method of any one of Examples 14 to 17.

Example 26 is a processor or other apparatus substantially as described herein.

Example 27 is a processor or other apparatus that is operative to perform any method substantially as described herein.

Example 28 is a processor or other apparatus that includes a means for conveying a physical storage location identifier end-to-end from a first register rename storage structure to a second register rename storage structure. The apparatus also includes a means for conveying a corresponding one or more redundant bits, which correspond to the physical storage location identifier, end-to-end from the first register rename storage structure to the second register rename storage structure.

Example 29 is an article of manufacture that includes a non-transitory machine-readable storage medium. The non-transitory machine-readable storage medium stores instructions and data thereon. The instructions, if performed by integrated circuit manufacturing machinery, will cause the integrated circuit manufacturing machinery to make an integrated circuit. The integrated circuit is to include a first register rename storage structure to store a given physical storage location identifier, which is to identify a physical storage location of a plurality of physical storage locations, and a corresponding given set of one or more redundant bits. The integrated circuit is also to include a second register rename storage structure. The integrated circuit is also to include a first conductive path coupling the first and second register rename storage structures. The first conductive path is to convey the given set of the one or more redundant bits end-to-end from the first register rename storage structure to the second register rename storage structure.

What is claimed is:

1. A processor comprising:
    a plurality of physical storage locations; and
    a register rename unit comprising:
        a first register rename storage structure to store a given physical storage location identifier, which is to identify a physical storage location of the plurality of physical storage locations, and a corresponding given one or more redundant bits, wherein the given one or more redundant bits are redundant relative to the given physical storage location identifier;
        a second register rename storage structure; and
        a first conductive path coupling the first and second register rename storage structures, the first conductive path to convey the given one or more redundant bits end-to-end from the first register rename storage structure to the second register rename storage structure.

2. The processor of claim 1, wherein the register rename unit does not have redundant bit generation logic directly coupled with the first conductive path to regenerate the given one or more redundant bits from the given physical storage location identifier that is to be conveyed end-to-end from the first register rename storage structure to the second register rename storage structure.

3. The processor of claim 1, wherein the register rename unit does not have error detection logic directly coupled with the first conductive path to perform error detection using the given one or more redundant bits that is to be conveyed end-to-end from the first register rename storage structure to the second register rename storage structure.

4. The processor of claim 1, further comprising error detection logic directly coupled with a second conductive path leading from the register rename unit to a scheduler unit, the error detection logic to receive a second physical storage location identifier and a corresponding second one or more redundant bits, the error detection logic to detect an error when the second physical storage location identifier and the corresponding second one or more redundant bits are inconsistent with one another.

5. The processor of claim 4, wherein the error detection logic is able to detect an error that occurs in the second physical storage location identifier at any point along the first conductive path.

6. The processor of claim 1, wherein the first register rename storage structure comprises a free list storage structure, and further comprising redundant bit generation logic to generate the corresponding given one or more redundant bits when the given physical storage location identifier is stored to the free list storage structure.

7. The processor of claim 1, wherein the first storage structure comprises a free list storage structure, and wherein the second storage structure comprises a register map storage structure.

8. The processor of claim 1, wherein the first storage structure comprises a register map storage structure, and wherein the second storage structure comprises one of a checkpoint table storage structure, a reclamation table storage structure, and a register history table storage structure.

9. The processor of claim 1, further comprising a third register rename storage structure, and wherein the given one or more redundant bits and the given physical storage location identifier are to be conveyed together from the second register rename storage structure to the third register rename storage structure.

10. The processor of claim 1, wherein the conductive path comprises one or more bit channels dedicated to conveying one or more redundant bits.

11. The processor of claim 1, wherein the one or more redundant bits comprise one or more parity bits.

12. The processor of claim 1, wherein the given one or more redundant bits comprises at least two redundant bits.

13. The processor of claim 1, wherein the given one or more redundant bits comprises a plurality of error correction bits.

14. A method performed by processor, the method comprising:
    conveying a physical storage location identifier end-to-end from a first register rename storage structure to a second register rename storage structure; and
    conveying a corresponding one or more redundant bits, which correspond to the physical storage location identifier, end-to-end from the first register rename storage structure to the second register rename storage structure, wherein the one or more redundant bits are derivable from the physical storage location identifier.

15. The method of claim 14, further comprising providing the physical storage location identifier and the corresponding one or more redundant bits to error detection logic when providing the physical storage location identifier to a scheduler unit.

16. The method of claim 14, further comprising:
    outputting the corresponding one or more redundant bits from the first register rename storage structure; and storing the corresponding one or more redundant bits in the second register rename storage structure without regenerating the corresponding one or more redundant bits between a time the corresponding one or more redundant bits are output from the first register rename storage structure and a time the corresponding one or more redundant bits are stored in the second register rename storage structure.

17. The method of claim 14, further comprising:
outputting the corresponding one or more redundant bits from the first register rename storage structure; and
storing the corresponding one or more redundant bits in the second register rename storage structure without performing error detection using the corresponding one or more redundant bits between a time the corresponding one or more redundant bits are output from the first register rename storage structure and a time the corresponding one or more redundant bits are stored in the second register rename storage structure.

18. A computer system comprising:
an interconnect;
a dynamic random access memory (DRAM) coupled with the interconnect; and
a processor coupled with the interconnect, the processor comprising:
  a plurality of physical storage locations; and
  a register rename unit comprising:
    a first register rename storage structure to store a given physical storage location identifier, which is to identify a physical storage location of the plurality of physical storage locations, and a corresponding given one or more redundant bits, wherein the given one or more redundant bits are able to be used for error detection on the given physical storage location identifier;
    a second register rename storage structure; and
    a first conductive path coupling the first and second register rename storage structures, the first conductive path to convey the given one or more redundant bits end-to-end from the first register rename storage structure to the second register rename storage structure.

19. The computer system of claim 18, wherein the register rename unit does not have redundant bit generation logic directly coupled with the first conductive path to regenerate the given one or more redundant bits from the given physical storage location identifier that is to be conveyed end-to-end from the first register rename storage structure to the second register rename storage structure.

20. The computer system of claim 18, wherein the register rename unit does not have error detection logic directly coupled with the first conductive path to perform error detection using the given one or more redundant bits that is to be conveyed end-to-end from the first register rename storage structure to the second register rename storage structure.

21. The computer system of claim 18, further comprising error detection logic directly coupled with a second conductive path leading from the register rename unit to a scheduler unit, the error detection logic to receive a second physical storage location identifier and a corresponding second one or more redundant bits, the error detection logic to detect an error when the second physical storage location identifier and the corresponding second one or more redundant bits are inconsistent with one another.

22. The computer system of claim 18, wherein the given one or more redundant bits comprises at least two redundant bits.

23. The computer system of claim 18, wherein the given one or more redundant bits comprises a plurality of error correction bits.

* * * * *